United States Patent
Phelps et al.

(10) Patent No.: US 8,336,119 B2
(45) Date of Patent: Dec. 25, 2012

(54) HAND COVERING WITH CONDUCTIVE PORTION

(75) Inventors: Deborah Lynn Phelps, Baltimore, MD (US); Lonnie Drosihn, Monkton, MD (US)

(73) Assignee: 180's. Inc., Baltimore, MD (US)

( * ) Notice: Subject to any disclaimer, the term of this patent is extended or adjusted under 35 U.S.C. 154(b) by 130 days.

(21) Appl. No.: 12/791,378

(22) Filed: Jun. 1, 2010

(65) Prior Publication Data

US 2011/0016609 A1  Jan. 27, 2011

Related U.S. Application Data

(63) Continuation-in-part of application No. 12/330,738, filed on Dec. 9, 2008.

(60) Provisional application No. 61/183,341, filed on Jun. 2, 2009, provisional application No. 61/012,442, filed on Dec. 9, 2007.

(51) Int. Cl.
*A41D 19/00* (2006.01)
*A41D 31/02* (2006.01)
*A41D 27/02* (2006.01)

(52) U.S. Cl. .......... 2/167; 2/159; 2/160; 2/164

(58) Field of Classification Search .......... 2/159, 160, 2/161.1, 161.6, 161.7, 163, 164, 167, 243.1, 2/247, 250, 272, 905
See application file for complete search history.

(56) References Cited

U.S. PATENT DOCUMENTS

| | | |
|---|---|---|
| 206,474 A | 7/1878 | Morel |
| 428,115 A | 5/1890 | Levy |
| 497,822 A | 5/1893 | Royer |
| 884,681 A | 4/1908 | Reed |
| 1,380,960 A | 6/1921 | Hmenia |
| 1,545,413 A | 7/1925 | Elmvall |
| 1,979,130 A | 10/1934 | Wiley |
| 2,261,072 A | 10/1941 | Monahan |
| 2,311,276 A | 2/1943 | Wilcox |
| D168,689 S | 1/1953 | Jones |
| 2,895,139 A | 7/1959 | Compton |
| 3,544,841 A | 12/1970 | Peel |
| 3,845,771 A | 11/1974 | Vise |
| 3,953,935 A | 5/1976 | Reiner et al. |
| 4,016,868 A | 4/1977 | Allison |
| 4,510,939 A | 4/1985 | Brenman et al. |
| 4,589,146 A | 5/1986 | Taylor |
| 4,613,139 A | 9/1986 | Robinson, II |
| 4,654,748 A | 3/1987 | Rees |
| 4,712,253 A | 12/1987 | Chen |

(Continued)

FOREIGN PATENT DOCUMENTS

CA  2534160 A1  7/2007

(Continued)

OTHER PUBLICATIONS iTWYF product slides from www.itwyf.com (16 pages).

(Continued)

*Primary Examiner* — Bobby Muromoto, Jr.

(57) ABSTRACT

Hand coverings having a conductive portion are described herein. In some embodiments, a hand covering includes a shell defining an opening. A conductive membrane can project through the opening, such that a first portion of the conductive membrane disposed outside the shell is operable to interact with an interface of an electronic device. A second portion of the conductive membrane can be disposed inside the shell. Some embodiments described herein further include a second conductive membrane disposed within the shell and coupled to the first conductive membrane.

20 Claims, 35 Drawing Sheets

U.S. PATENT DOCUMENTS

| | | |
|---|---|---|
| 4,723,324 A | 2/1988 | Lassiter |
| 4,762,497 A | 8/1988 | Burvee |
| 4,765,343 A | 8/1988 | Brenman et al. |
| 4,779,290 A | 10/1988 | Welch et al. |
| 4,964,174 A | 10/1990 | Martin |
| 5,047,952 A | 9/1991 | Kramer et al. |
| 5,070,862 A | 12/1991 | Berlant |
| 5,390,371 A | 2/1995 | Sigward |
| 5,488,362 A | 1/1996 | Ullman et al. |
| 5,598,584 A | 2/1997 | Da Grossa |
| 5,631,861 A | 5/1997 | Kramer |
| 5,640,713 A | 6/1997 | Ping |
| 5,687,424 A | 11/1997 | Masley |
| 5,715,536 A | 2/1998 | Banks |
| 5,829,061 A | 11/1998 | Visgil et al. |
| 5,875,489 A | 3/1999 | Couto |
| 6,029,276 A | 2/2000 | White |
| 6,049,327 A | 4/2000 | Walker et al. |
| 6,075,189 A | 6/2000 | Robb |
| 6,104,379 A | 8/2000 | Petrich et al. |
| 6,110,186 A | 8/2000 | Rizvi |
| 6,126,373 A | 10/2000 | Yee et al. |
| 6,128,004 A | 10/2000 | McDowall et al. |
| 6,128,778 A | 10/2000 | Castagneri |
| 6,249,277 B1 | 6/2001 | Varveris |
| 6,338,162 B1 | 1/2002 | Geng |
| 6,374,417 B1 | 4/2002 | Stagnitta |
| 6,401,252 B1 | 6/2002 | Dean |
| 6,408,441 B1 | 6/2002 | Smith et al. |
| D468,870 S | 1/2003 | Bufford |
| 6,527,464 B2 | 3/2003 | Lee |
| 6,533,480 B2 | 3/2003 | Schneider |
| 6,549,391 B1 | 4/2003 | Bisson |
| 6,618,236 B1 | 9/2003 | Tsuwako et al. |
| 6,626,598 B2 | 9/2003 | Schneider |
| 6,669,657 B1 | 12/2003 | Ongwela |
| D488,588 S | 4/2004 | Murphy |
| 6,809,462 B2 | 10/2004 | Pelrine et al. |
| 6,904,614 B2 | 6/2005 | Yamazaki et al. |
| 7,022,917 B2 | 4/2006 | Jung et al. |
| 7,100,212 B2 | 9/2006 | Jaeger |
| 7,103,918 B2 | 9/2006 | Isom et al. |
| 7,103,919 B2 | 9/2006 | Isom et al. |
| 7,159,246 B2 | 1/2007 | Tippey |
| 7,202,443 B2 | 4/2007 | Rock et al. |
| 7,218,313 B2 | 5/2007 | Marcus et al. |
| 7,250,935 B2 | 7/2007 | Kubota et al. |
| 7,268,320 B2 | 9/2007 | Rock et al. |
| 7,335,395 B2 | 2/2008 | Ward et al. |
| 7,335,528 B2 | 2/2008 | Rueckes et al. |
| 7,356,852 B2 | 4/2008 | Thai |
| 7,365,031 B2 | 4/2008 | Swallow et al. |
| 7,559,768 B2 | 7/2009 | Marmaropoulos et al. |
| 7,721,353 B2 | 5/2010 | Saturnio |
| 7,842,879 B1 | 11/2010 | Carter |
| 7,849,521 B1 | 12/2010 | Cromwell |
| 7,874,021 B2 | 1/2011 | Sunder et al. |
| 7,884,797 B1 | 2/2011 | Ning |
| 2002/0017567 A1 | 2/2002 | Connolly et al. |
| 2002/0030094 A1 | 3/2002 | Curry et al. |
| 2002/0117493 A1 | 8/2002 | Rock et al. |
| 2002/0134828 A1 | 9/2002 | Sandbach et al. |
| 2002/0162732 A1 | 11/2002 | Sandbach et al. |
| 2002/0163495 A1 | 11/2002 | Doynov |
| 2002/0178830 A1 | 12/2002 | Kazerooni et al. |
| 2003/0057408 A1 | 3/2003 | Kazerooni et al. |
| 2003/0178413 A1 | 9/2003 | Rock et al. |
| 2003/0186608 A1 | 10/2003 | Goldberg |
| 2003/0224685 A1 | 12/2003 | Sharma |
| 2004/0045955 A1 | 3/2004 | Rock et al. |
| 2004/0046734 A1 | 3/2004 | Hart |
| 2004/0064870 A1 | 4/2004 | Gold |
| 2004/0118166 A1 | 6/2004 | Huang et al. |
| 2004/0164968 A1 | 8/2004 | Miyamoto |
| 2004/0199232 A1 | 10/2004 | Wallace et al. |
| 2004/0225052 A1 | 11/2004 | Bialke et al. |
| 2004/0239578 A1 | 12/2004 | Aisenbrey |
| 2004/0255361 A1 | 12/2004 | Senter et al. |
| 2004/0264851 A1 | 12/2004 | Amiri |
| 2005/0095938 A1 | 5/2005 | Rosenberger et al. |
| 2005/0127057 A1 | 6/2005 | Rock et al. |
| 2005/0151722 A1 | 7/2005 | Meteyer |
| 2005/0210652 A1 | 9/2005 | Epstein |
| 2005/0223469 A1 | 10/2005 | Banton |
| 2005/0231471 A1 | 10/2005 | Mallard et al. |
| 2006/0221066 A1 | 10/2006 | Cascella |
| 2006/0226184 A1 | 10/2006 | Karzmer |
| 2007/0178716 A1 | 8/2007 | Glaser et al. |
| 2007/0245454 A1 | 10/2007 | Eklund |
| 2008/0010718 A1 | 1/2008 | Richards |
| 2008/0084390 A1 | 4/2008 | Jones |
| 2008/0282446 A1 | 11/2008 | Komlos |
| 2009/0066658 A1 | 3/2009 | Earl |
| 2009/0153369 A1 | 6/2009 | Baier et al. |
| 2009/0156309 A1 | 6/2009 | Weston et al. |
| 2009/0183297 A1 | 7/2009 | Drosihn |
| 2009/0312826 A1 | 12/2009 | Penny et al. |
| 2009/0322685 A1 | 12/2009 | Lee |
| 2010/0039392 A1 | 2/2010 | Pratt et al. |
| 2010/0058513 A1 | 3/2010 | Drosihn et al. |
| 2010/0090966 A1 | 4/2010 | Gregorio |
| 2010/0225590 A1 | 9/2010 | Pereira |
| 2010/0231505 A1 | 9/2010 | Iwata |
| 2010/0242153 A1 | 9/2010 | Harrison |

FOREIGN PATENT DOCUMENTS

| | | |
|---|---|---|
| CN | 2909876 Y | 6/2007 |
| DE | 29709211 U1 | 11/1997 |
| EP | 1387242 A2 | 2/2004 |
| EP | 1769325 B1 | 4/2007 |
| FR | 2789274 A1 | 8/2000 |
| FR | 2849754 A1 | 7/2004 |
| FR | 2864803 A1 | 8/2005 |
| GB | 2284341 A | 6/1995 |
| GB | 2339495 A | 1/2000 |
| GB | 2438471 A | 11/2007 |
| JP | 58-192924 | 12/1983 |
| JP | 59-144604 A | 8/1984 |
| JP | 59-165412 | 11/1984 |
| JP | 64-14120 U | 1/1989 |
| JP | 4-56706 | 5/1992 |
| JP | 4163303 A | 6/1992 |
| JP | 3022639 | 1/1996 |
| JP | 10-66467 A | 3/1998 |
| JP | 2001115319 A | 4/2001 |
| JP | 2002285409 A | 10/2002 |
| JP | 2002309420 A | 10/2002 |
| JP | 2006-63456 | 3/2006 |
| JP | 2006058973 | 3/2006 |
| JP | 2008081896 A | 4/2008 |
| JP | 2009102779 A | 5/2009 |
| KR | 10-2005-0123052 A | 12/2005 |
| WO | 9007734 A1 | 7/1990 |
| WO | 2007/138292 A2 | 12/2007 |
| WO | 2010130632 A2 | 11/2010 |

OTHER PUBLICATIONS iTWYF product brochure from www.itwyf.com (6 pages).
"TAVO gloves for the iPod"—www.engadget.com/2006/01/04/tavo-gloves-for-the-ipod/—6 pages, Jan. 4, 2006.
"iGlove Cold Weather iPod Gloves"—i.gizmodo.com/237279/iglove-cold-weather-ipod-gloves—2 pages, Feb. 16, 2007.
"iTWYF Gloves Lets You Play With Your Gadgets in the Cold"—gizmodo.com/gadgets/gadgets/itwyf-gloves-lets-you-play-with-your-gadgets-in-the-cold-223678.php—2 pages, Dec. 21, 2006.
"The. iPhone Glove"—www.dotsglove.com—2 pages. (c) 2008.
"Keeping Your Hands Warm and Texting, Too"—online.wsj.com/article/SB123198733366084499.html—2 pages, Jan. 14, 2009.
"Marmot Men's iGlove Multi (Fall 2007)"—www.moosejaw.com/moosejaw/product.asp?path=Search&path=marmot+mens+glo . . . —2 pages, (c) 1995-2007.
"freehands keep in touch"—shop.freehands.com—3 pages (c) 2009.
"North Face Etip gloves for touch screens"—www.gizmag.com/etip-gloves-for-touch-screens-from-north-face/13687/—3 pages, Jan. 6, 2010.

"Tavo Gloves let you use iPod in cold weather"—www.ilounge.com/index.php/news/comments/tavo-gloves-let-you-use-ipod-in-cold . . . —5 pages, Jan. 4, 2006.

"iGlove Multi"—marmot.com/catalog/fall_2007/10/20/50/node/769—2 pages, Fall 2007.

"iGlove Liner"—marmot.com/catalog/fall_2007/10/20/47/node/775/details—2 pages, Fall 2007.

"echo touch gloves"—www.echodesign.com/Category/features/Echo+Touch/default.aspx?rid=56—1 page, (c) 2010.

"Yay! Spend loads less on hottest holiday gifts"—today.msnbc.msn.com/id/34366887/—5 pages, Dec. 14, 2009.

"echo touch glove"—www.echodesign.com/Product/echo+touch+gloves/default.aspx?rid=4853&cr—2 pages, (c) 2010.

TouchTec web pages—touchtec.net—3 pages (c) 2010.

"TouchTec iPhone Gloves for Women, They're Finally Here!"—www.chipchick.com/2009/10/iphone-gloves.html—8 pages, Oct. 16, 2009.

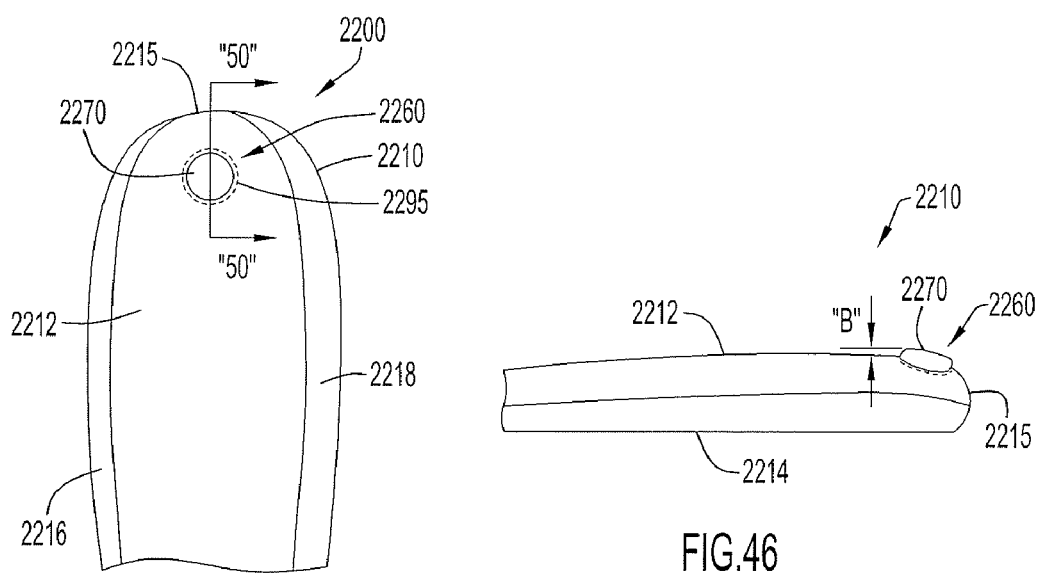

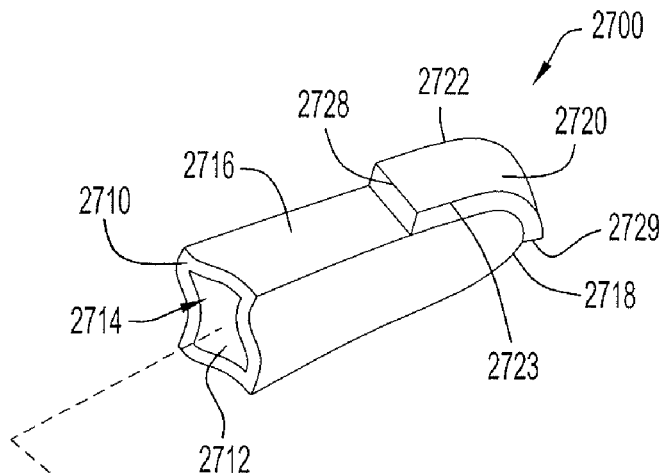
FIG.63
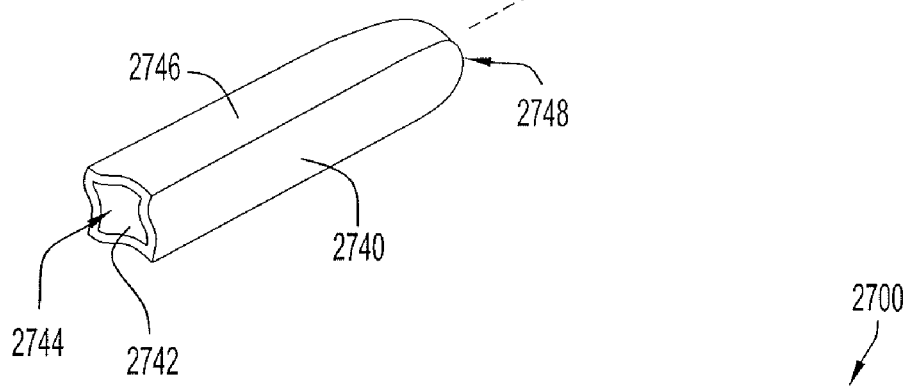
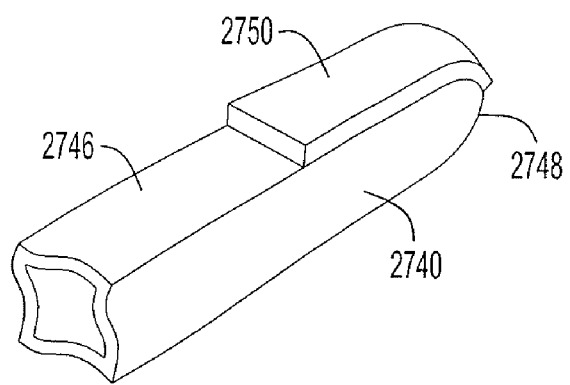
FIG.64

HAND COVERING WITH CONDUCTIVE PORTION

CROSS-REFERENCE TO RELATED APPLICATIONS

This application claims priority to and the benefit of U.S. Provisional Patent Application No. 61/183,341, filed Jun. 2, 2009, entitled "Hand Covering with Conductive Portion," the entire disclosure of which is incorporated herein by reference in its entirety. This application is also a continuation-in-part of U.S. Non-Provisional patent application Ser. No. 12/330,738, filed Dec. 9, 2008, entitled "Hand Covering with Tactility Features," which claims priority to and the benefit of U.S. Provisional Patent Application No. 61/012,442, filed Dec. 9, 2007, entitled "Hand Covering with Tactility Features," the entire disclosures of both applications are incorporated herein by reference in their entirety.

BACKGROUND OF THE INVENTION

In one embodiment, this invention relates generally to a hand covering. More specifically, the present invention relates to a hand covering with tactility features. The tactility features of the hand covering enable the wearer of the hand covering to have improved dexterity and tactility while wearing the hand covering and performing various tasks. In addition, the tactility features enable a user to perform various tasks such as interacting with an electronic device, without removing the hand covering.

In another embodiment, the invention relates to a hand covering that may be used with an electronic device. In particular, the hand covering includes a conductive portion that enables the wearer of the hand covering to perform various tasks, such as interacting with an electronic device, without removing the hand covering.

There are many types of electronic devices that are used for various reasons, including but not limited to, communications, entertainment, work, and maintaining information such as contacts and appointments. Many electronic devices are continuously decreasing in size while increasing in functionality. Several types of electronic devices are portable, such as phones, pagers, communicators, electronic organizers, personal digital assistants, and digital audio and/or video playing devices such as iPod®, iTouch®, iPhone®, iPad®, and Android mobile electronic devices or MP3 players.

The particular controls and methods of input for different electronic devices can vary. Some devices may include mechanical buttons or switches that can be activated by a user contacting the button or switch. Often, conventional hand coverings do not enable a user to accurately select and press a small mechanical button or switch.

Other electronic devices utilize a touch-sensitive technology for the interaction between the user and the device. One example of a touch sensitive technology is a touch screen which is an interactive screen that can be contacted by a user. Another example of a touch-sensitive technology is a track pad. The touch-sensitive technologies or applications sense and track a user's touch and its subsequent movement.

Some input mechanisms on electronic devices recognize particular types of inputs. For example, some input mechanisms may recognize input from a user's finger that is placed in contact with or near the input mechanisms.

Some applications are resistive-type systems that include a resistive layer of material and a conductive layer of material that are disposed proximate to each other and separated by a narrow space of air. When a user touches a resistive-type screen or pad, the two layers contact each other in that exact spot, thereby changing the electric field and the particular spot can be identified. Thus, a resistive-type system registers a touch or input as long as the two layers make contact. The contact can be made using any type of object.

Other applications are capacitive-type systems that include a conductive layer of material that stores an electrical charge. When a user touches a capacitive-type screen or pad, a portion of the charge is transferred between the user and the screen or pad. As a result, the charge on the capacitive layer changes. Once this change occurs, the particular location of the change can be determined by a controller. A capacitive system needs a conductive input to register a touch or input. Such a conductive input can be made using a user's finger.

In an electronic device with a capacitive-type touch-sensing interface, a controller supplies electrical current to metal channels or conductors that form a grid and conduct electricity. When another conductor, such as a user's finger, is moved close to the grid, current wants to flow to the finger to complete a circuit. Typically, the electronic device includes a non-conductive item, such as a non-conductive piece of plastic, in the way. Thus, a charge builds up at a point on the grid that is the closest to the finger. The build-up of electrical charge between two conductors is called capacitance. The controller of the electronic device measures any changes in capacitance and a signal is generated and sent to the microprocessor of the electronic device.

As electronic devices become smaller, the available space for input or control structures on the electronic devices decreases as well. Resistive-type and capacitive-type touch-sensing technologies are utilized on many electronic devices. These touch-sensing technologies use capacitive and resistive buttons which can replace the small mechanical button and switch input devices.

As mentioned above, capacitive touch-sensing requires a conductive input to register a touch by a user. While a conductive input can be accomplished through the touch of a user's finger, such a conductive input is difficult when a user is wearing a hand covering. Hand coverings such as gloves and mittens are worn for protection from cold weather or other environmental conditions. There is a decrease in tactile sensitivity when a user is wearing a conventional hand covering. In addition, conventional hand coverings do not allow a user to provide a necessary conductive input to an electronic device. Accordingly, to operate and utilize many electronic devices, a user must remove one or more digits from a hand covering, which can be cumbersome and difficult, leading to frustration of the wearer of the hand covering.

Accordingly, there is a need for a hand covering that facilitates the manipulation of an electronic device by a user. In addition, there is a need for a hand covering that allows a user to control an electronic device without the need to remove the hand covering.

SUMMARY OF THE INVENTION

A hand covering according to the present invention includes several finger receptacles and a thumb receptacle. The hand covering also includes at least one tactility component coupled thereto. In one embodiment, the tactility component can be coupled to one of the finger receptacles, such as the finger receptacle intended for use with an index finger. In another embodiment, the tactility component can be coupled to the thumb receptacle. In another embodiment, tactility components can be coupled to a finger receptacle and to the thumb receptacle.

Additionally, a hand covering according to the present invention can include a region of improved dexterity in the hand covering. The region of improved dexterity can be the result of a portion of the hand covering having a reduced thickness. In one embodiment, a finger receptacle of the hand covering can have a reduced thickness. In that implementation, the thickness of the material defining the finger receptacle can be less than the thickness of the material defining the rest of the shell of the hand covering. In another embodiment, a thumb receptacle of the hand covering can have a reduced thickness due to a thinner material defining the thumb receptacle than the remainder of the hand covering.

In one embodiment, a hand covering according to the present invention can include a thinner region defining a finger receptacle and/or a thumb receptacle and one or more tactility components coupled to a finger receptacle and/or a thumb receptacle, respectively. Different sizes and configurations of tactility components can be used.

In one embodiment, a hand covering can include one or more materials that facilitate a conductive input to an electronic device. The material or materials eliminate the need for a user to remove the hand covering for such an input.

This invention is also directed to a hand covering. In particular, this invention is directed to a hand covering that may be used with an electronic device. The hand covering includes a conductive portion that enables the wearer of the hand covering to perform various tasks, such as interacting with an electronic device, without removing the hand covering. The conductive portion enables a wearer of the hand covering to provide inputs to an input mechanism of an electronic device.

In different embodiments, the construction of the hand covering can vary depending on the intended use of the hand covering. For example, in one embodiment, the hand covering may include a single layer of material and may be intended for use in warmer conditions. In another embodiment, the hand covering may include multiple layers of material and may be intended for use in colder conditions. A hand covering with multiple layers of material may include an inner layer, a layer of insulation, and an outer layer.

In one embodiment, the conductive portion of the hand covering includes a conductive member. The conductive member can be a conductive piece of material such as a fabric with conductive fibers or threads inserted or woven therein. In another embodiment, the conductive portion of the hand covering includes multiple conductive members. In one implementation, the conductive members can be placed in contact with an adjacent conductive member. In another implementation, the conductive members can be placed proximate to, but not in contact with, an adjacent conductive member.

In some embodiments, the conductive portion of a hand covering is configured so that part of the conductive portion can be easily placed in contact with an electronic device. In one implementation, the conductive portion of the hand covering includes an insert that is positioned to cause a portion of a conductive member to project and extend outwardly from the hand covering, thereby making contact with an electronic device easier. The hand covering has an outer surface and the conductive portion extends outwardly beyond the outer surface of the hand covering. The insert can be located along the inner side of a conductive member to force part of the conductive member outwardly relative to the hand covering.

In some embodiments, the hand covering may include a conductive portion on a finger receptacle of the hand covering. In one embodiment, the hand covering may include a conductive portion on a finger receptacle and on a thumb receptacle.

In one embodiment, a hand covering includes a shell including a palm region, a cuff region, and a finger region, the finger region including a finger receptacle, the shell including a layer of material, and a conductive portion coupled to the finger receptacle, the conductive portion including a first conductive member and a separate, second conductive member, the second conductive member being in contact with the first conductive member, the first conductive member being configured to interact with an interface on an electronic device, the first conductive member being configured to extend through a portion of the layer of material.

In an alternative embodiment, the conductive portion includes an insert disposed between the first conductive member and the second conductive member. In another embodiment, the first conductive member and the second conductive member are coupled to the layer of material.

In an alternative embodiment, the layer of material is a first layer of material and the shell includes a second layer of material, the first layer of material forming an interior region, the second layer of material being located within the interior region, the second conductive material being coupled to the second layer of material. In another embodiment, the first layer of material includes an opening formed therein and extending through the first layer of material, the first conductive member extending through the opening in the first layer of material. In another embodiment, the first conductive member and the second conductive member are coupled to an inner surface of the first layer of material.

In an alternative embodiment, the layer of material is a first layer of material and the shell includes a second layer of material and a third layer of material, the second layer of material being disposed within the first layer of material, the third layer of material being disposed within the second layer of material, the conductive portion including a third conductive member, the third conductive member being coupled to the third layer of material, and the first conductive member and the second conductive member being coupled to the first layer of material.

In another embodiment, the second layer of material includes an opening formed therein, the third conductive member being in contact with the second conductive member via the opening in the second layer of material.

In another embodiment, the contact between the first conductive member and the second conductive member is fixed and the contact between the second conductive member and the third conductive member is not fixed.

In another embodiment, the first conductive member is fixed relative to the second conductive member, and the second conductive member is movable relative to the third conductive member.

In another embodiment, the conductive portion includes a non-conductive insert disposed between the first conductive member and the second conductive member.

In another embodiment, the first layer of material includes an opening through which the first conductive member extends, the opening in the first layer of material being substantially aligned with the opening in the second layer of material.

In another embodiment, the opening in the first layer of material is a different size than the opening in the second layer of material.

In another embodiment, the shell includes a fourth layer of material being disposed between the second layer of material and the third layer of material.

In an alternative embodiment, the hand covering includes a shell including a finger region including a finger receptacle, the shell including a first layer of material and a second layer of material disposed within the first layer of material, and a conductive portion coupled to the finger receptacle, the conductive portion including a first conductive member and a separate, second conductive member in contact with the first conductive member, the first conductive member being configured to interact with an interface on an electronic device, the first conductive member extending through an opening formed in the first layer of material, and the second conductive member being coupled to the second layer of material.

In another embodiment, at least one of the first conductive member or the second conductive member is flexible.

In another embodiment, the conductive portion includes a separate, third conductive member in contact with the second conductive member.

In another embodiment, the shell includes a third layer of material, the third layer of material being disposed within the second layer of material, the conductive portion including a third conductive member, the third conductive member being coupled to the third layer of material, and the first conductive member and the second conductive member being coupled to the first layer of material.

In an alternative embodiment, the hand covering includes a shell including a palm region, a cuff region, and a finger region, the finger region including a finger receptacle, the shell including a first layer of material and a second layer of material disposed within the first layer of material, the first layer of material including an opening formed therein, the opening extending through the first layer of material, and a conductive member coupled to the finger receptacle, the conductive member including a layer of flexible conductive material and an insert, the flexible conductive member being configured interact with an interface on an electronic device, the conductive member extending through the opening in the first layer of material, the insert being located between the layer of flexible conductive material and the second layer of material.

In another embodiment, the layer of flexible conductive material is stitched to the first layer of material and to the second layer of material.

BRIEF DESCRIPTION OF THE DRAWINGS

FIG. 45 is a palm side view of another embodiment of a finger receptacle for a hand covering.

FIG. 46 is a side view of the finger receptacle illustrated in FIG. 45.

FIG. 63 is a perspective view of some components of another embodiment of a finger receptacle for a hand covering.

FIG. 64 is a perspective view of a portion of another embodiment of a finger receptacle for a hand covering.

Like reference numerals have been used to identify like elements throughout this disclosure

DETAILED DESCRIPTION OF THE INVENTION

This invention is directed to a hand covering that may be used with an electronic device. In one embodiment, the hand covering includes a tactility component coupled thereto. In another embodiment, a portion of the hand covering can have a reduced thickness as compared to other parts of the hand covering. In one embodiment, the hand covering includes a conductive portion that enables the wearer of the hand covering to perform various tasks, such as interacting with an electronic device, without removing the hand covering. In one embodiment, the hand covering includes several finger receptacles and a thumb receptacle.

The term "hand covering" is used to include any type of covering that can be worn on a person's hand, such as a glove or a mitten or any variation thereof In addition, while the term "finger receptacle" is used to refer to a receptacle of a hand covering that can receive a finger, the term "finger receptacle" may also be used to refer to a receptacle that can receive a thumb of a user. The term "layer" may be used to refer to any piece of material is used in the construction of a hand covering. A material layer may extend around a user's finger or hand or along part of a user's finger or hand. In the embodiments of hand coverings disclosed herein, the layers of material extend around the corresponding finger or hand. The term "conductive" is used to refer to a material that is electrically conductive. The terms "user" and "wearer" are used interchangeably to refer to the person or individual who is wearing the hand covering on a hand.

Figure 1:
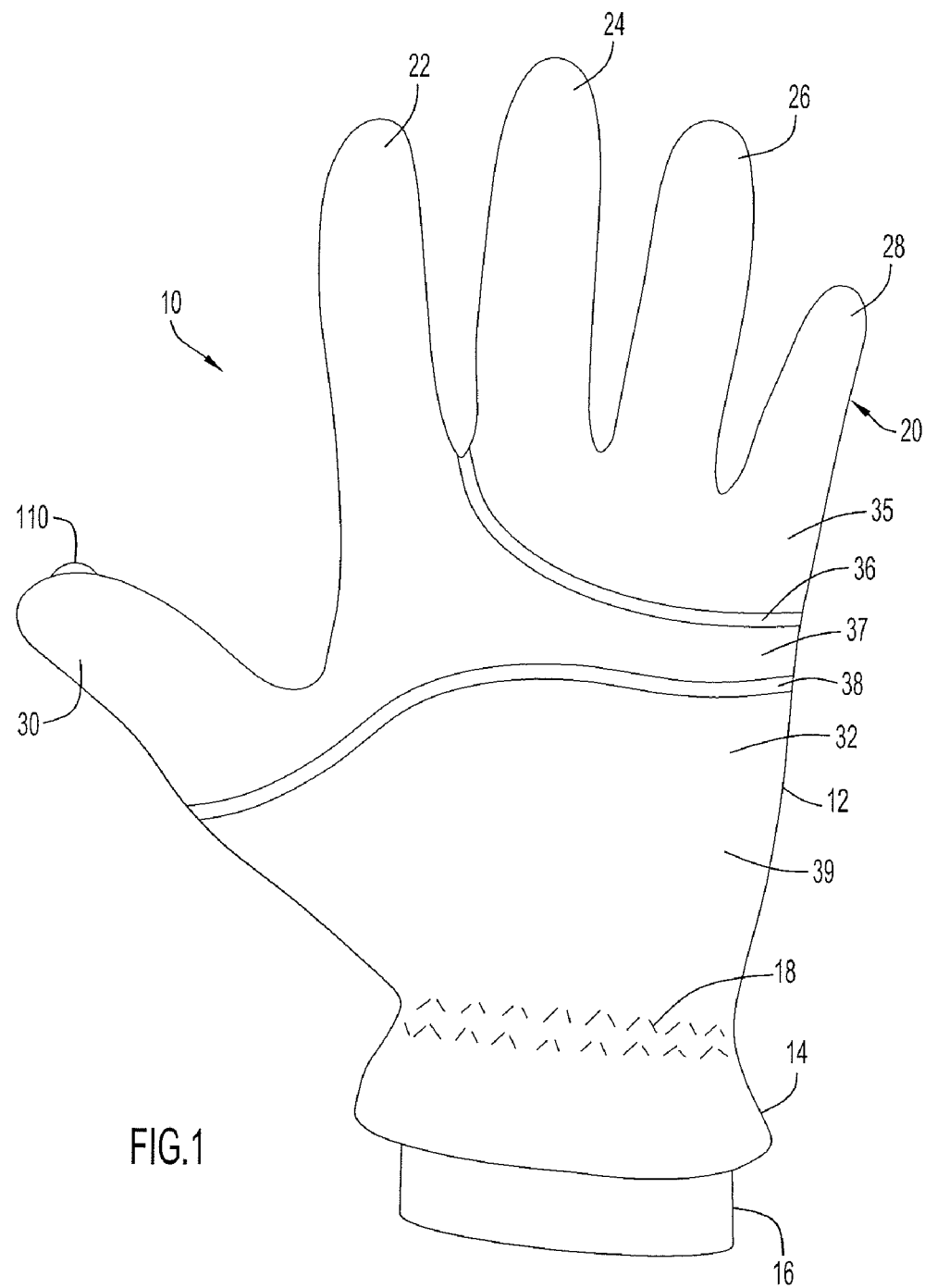
FIG. 1 is a top view of an embodiment of a hand covering according to the present invention.
Figure 2:
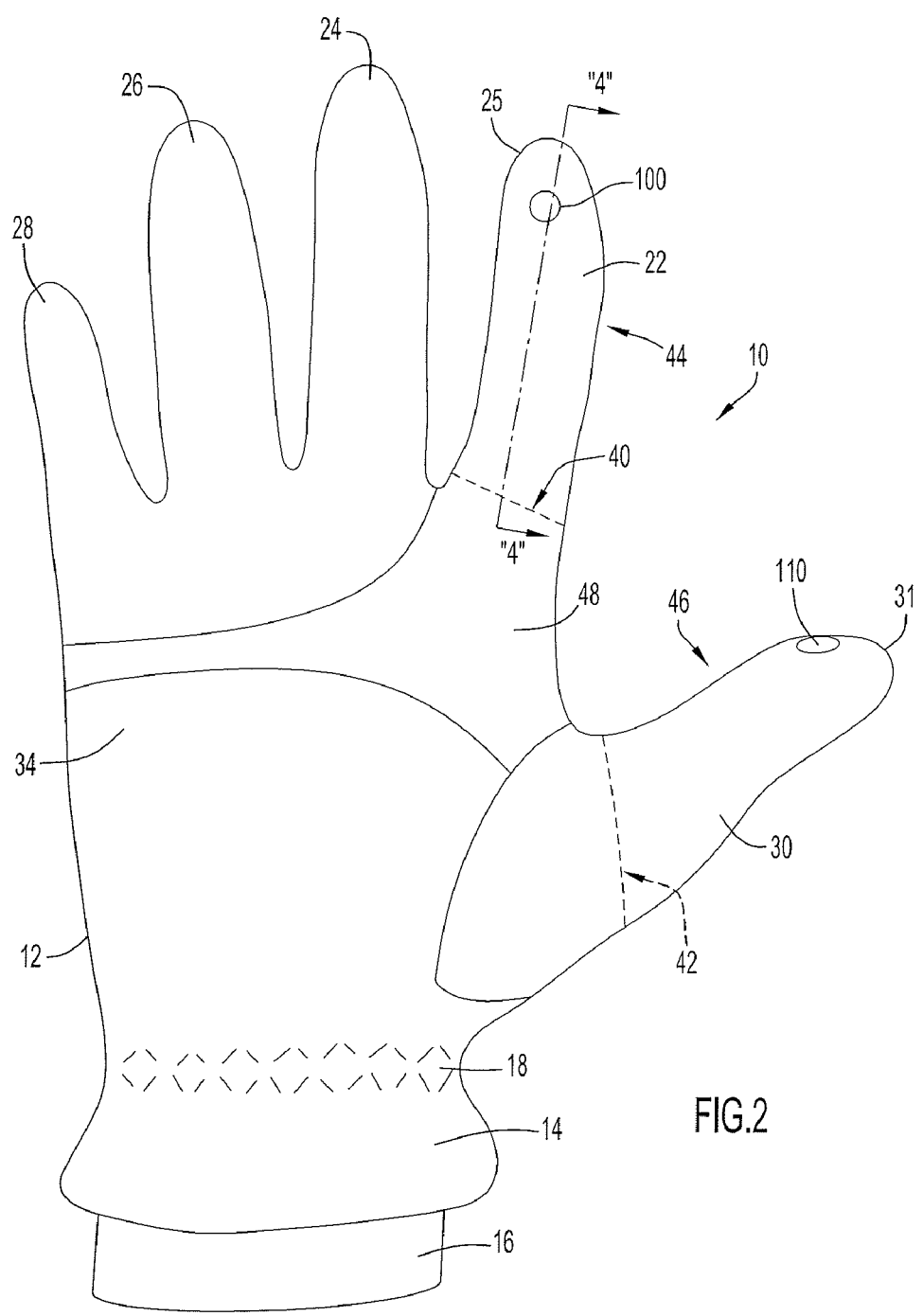
FIG. 2 is a bottom view of the hand covering illustrated in FIG. 1.

An embodiment of a hand covering according to the present invention is illustrated in FIGS. 1 and 2. The hand covering 10 includes a shell or shell assembly that has a palm portion or region 12, a cuff portion or region or skirt 14, and a finger region 20. The hand covering 10 also includes a fleece inner cuff 16 that is coupled to the shell by stitching 18, which forms part of an elastic wrist portion. Cuff 16 and cuff skirt 14 collectively provide protection against external elements entering into the interior of the hand covering 10. The finger region 20 has several finger receptacles 22, 24, 26, and 28, and a thumb receptacle 30. The shell includes a back side 32 (see FIG. 1) and a palm side 34 (see FIG. 2). In this embodiment, the material used for hand covering 10 is a tight fitting material with some stretching functionality and characteristics that allow for improved dexterity.

In one embodiment, the hand covering 10 may have certain colors or stylized features. As shown in FIG. 1, rubber molded articles 36 and 38 can be included as part of the shell to create a desired appearance. The rubber molded articles 36 and 38 can be used to define different portions of the shell of the hand covering 10. In particular, articles 36 and 38 can create or define sections 35, 37, and 39 that can be formed of different materials. For example, one or more of the sections 35, 37, and 39 can be formed of an elastic type, stretch material. The wearer can feel or sense the different zones of materials of the hand covering 10.

As illustrated in FIGS. 1 and 2, the hand covering 10 includes tactility components 100 and 110. Tactility components 100 and 110 are coupled to the hand covering 10 and are disposed in locations where the user or wearer of the glove typically engages an object. For example, a person wearing a hand covering performs actions, such as pressing buttons, most often with his or her index finger and/or thumb. Tactility components 100 and 110 can be referred to as buttons or projections and can be molded articles made of rubber or plastic. Alternatively, tactility buttons 100 and 110 can be silicon gel articles molded into a particular shape or configuration. Depending on the material, the tactility components can be coupled or adhered to the hand covering using an adhesive, by bonding, or other types of connecting or coupled techniques. The tactility components 100 and 110 are configured to facilitate the application of a concentrated force from a finger contained in the finger receptacle or thumb receptacle to an object.

In this embodiment, tactility component 100 is coupled to the palm side of finger receptacle 22, which corresponds to the index finger of a user. Tactility component 100 is coupled to the finger receptacle 22 close to the distal tip 25 of the finger receptacle 22, in which case, the component 100 would be closer to the tip of the index finger as opposed to the flat portion of the index finger. Tactility component 110 is coupled to the thumb receptacle 30 and in particular, to the inside surface or edge of the thumb receptacle 30 (noting that tactility component 110 can be seen in the back side view illustrated in FIG. 1). As a wearer of the hand covering 10 brings the wearer's index finger and thumb toward each other, the tip of the index finger and an inside surface or edge of the thumb contact usually each other first. Accordingly, the locations of the tactility components 100 and 110 on finger receptacle 22 and thumb receptacle 30, respectively, are selected based on the typically contacts of the index finger and thumb with an object. Thus, in this embodiment, tactility component 110 is not located on the main flat portion of the thumb receptacle 30, but is offset to the inner side or edge. In alternative embodiments, the locations of the tactility components on the finger receptacle and the thumb receptacle can vary.

Figure 3A:
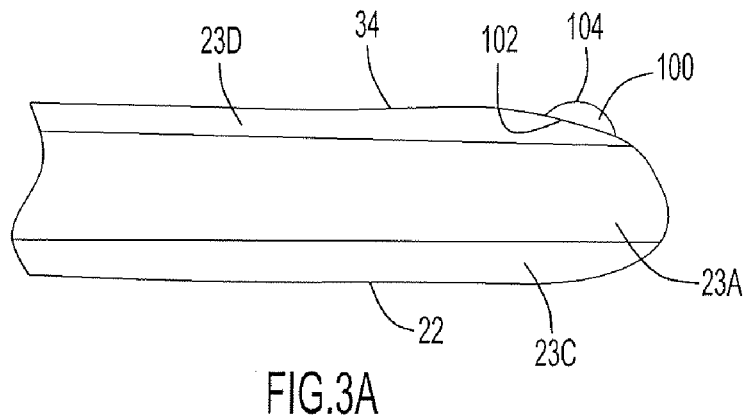
FIG. 3A is a side view of a portion of a finger receptacle of the hand covering illustrated in FIG. 1.

Referring to FIG. 3A, a side view of a portion of finger receptacle 22 is illustrated. As shown, finger receptacle 22 includes a palm side 34 to which tactility component 100 is coupled. In this embodiment, tactility component 100 is a molded article that has a rounded or curved configuration. Tactility component 100 has a bottom surface 102 and a rounded upper or contact surface 104. The contact surface 104 provides a small, targeted surface area that the wearer of the hand covering 10 can use to contact or press a button or other small object. The contact surface 104 results in a targeted area of pressure and force exerted by the wearer's finger.

Figure 3B:
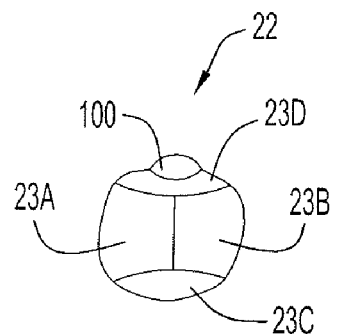
FIG. 3B is an end view of the portion of the finger receptacle illustrated in FIG. 3A.

Referring to FIG. 3B, an end view of a portion of finger receptacle 22 is illustrated. As shown, finger receptacle 22 has a "box like" construction with sections 23A, 23B, 23C, and 23D coupled together at seams. Some of the sections form gussets that allow for a tighter feel of the finger receptacle 22. In different embodiments, additional finger receptacles can be constructed in a manner similar to finger receptacle 22.

As shown in FIG. 2, hand covering 10 includes two tactility areas or regions 44 and 46 that are defined in part by transition areas 40 and 42, respectively. In this embodiment, finger receptacle 22 includes tactility region 44 that is defined by transition area 40 and the tip 25 of the finger receptacle 22. Similarly, thumb receptacle 30 includes tactility region 46 that is defined by transition area 42 and the distal tip 31 of the thumb receptacle 30. The tactility areas 44 and 46 can also be referred to as shell portions.

Each tactility region is defined by the particular region having a reduced thickness of material as compared to the rest of the hand covering 10, which can be referred to as the body 48. Transition area 40 defines where the thickness of the body or palm portion 12 changes to a thinner cross-section in the tactility region 44 of finger receptacle 22. Similarly, transition area 42 defines where the thinner cross-sectional material in the tactility region 46 of thumb receptacle 30 begins. In this embodiment, the other finger receptacles 24, 26, and 28 have the same thickness as the body 48 or palm portion of the hand covering 10. In one embodiment, the thickness of the material in region 44 may be the same as the thickness of the material in region 46, and both thicknesses are less than the thickness of the material in the body 48 of the hand covering 10. In another embodiment, the thickness of the material in region 46 can be different than the thickness of the material in region 44, and both of those thicknesses being smaller than the thickness of the body 48.

Figure 4:
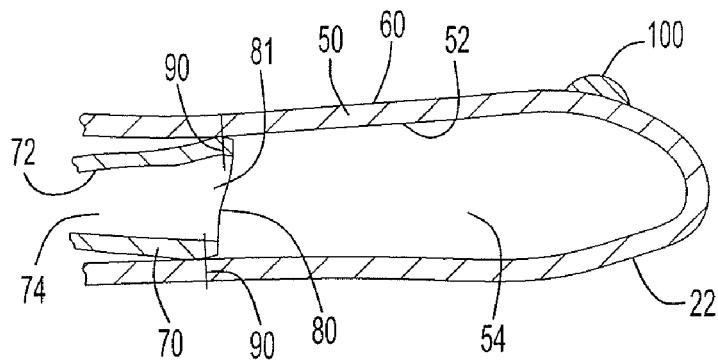
FIG. 4 is a cross-sectional side view of a portion of a finger receptacle of the hand covering illustrated in FIG. 2, taken along the line "4"-"4."
Figure 5:
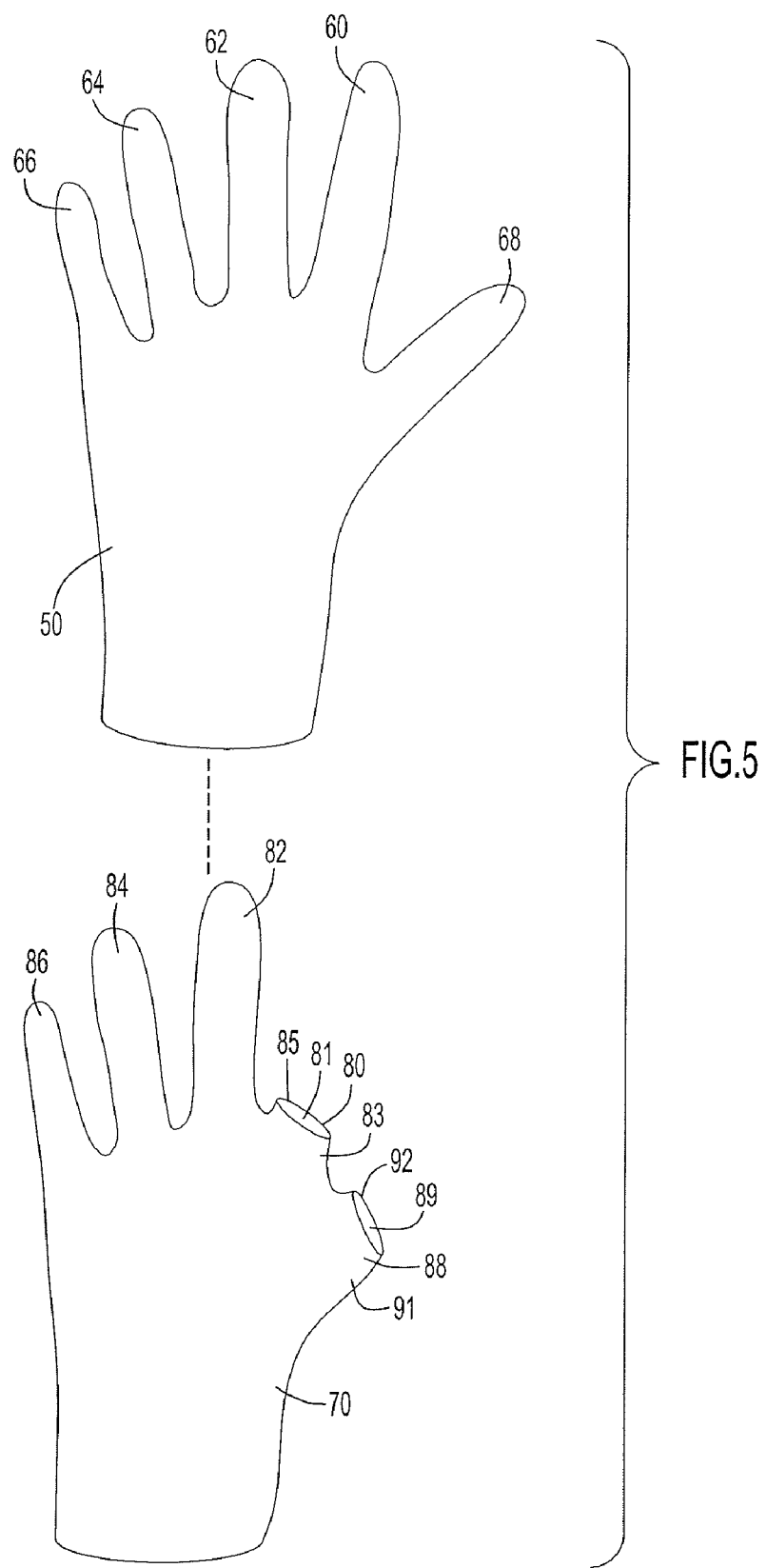
FIG. 5 is an exploded view of an outer shell and an inner shell of an embodiment of a hand covering according to the present invention.

Several of the components of an embodiment of a hand covering 10 according to the present invention are illustrated in FIGS. 4 and 5. Referring to FIG. 5, the hand covering 10 includes an outer or exterior shell 50 and an inner shell or liner 70. The outer shell or shell portion 50 includes finger receptacles 60, 62, 64, and 66, and a thumb receptacle 68. The inner shell or shell portion 70 includes finger receptacles 80, 82, 84, and 86, and a thumb receptacle 88. The outer shell 50 is slightly larger than inner shell 70 and is configured to receive the inner shell 70 therein. Each of the finger receptacles and thumb receptacle of the inner shell 70 is inserted into a corresponding finger receptacle or the thumb receptacle of the outer shell 50. In one embodiment, the inner shell 70 is a fleece liner.

As illustrated, finger receptacle 80, intended for a wearer's index finger, is cut or truncated close to the base 83 of the finger receptacle 80. The end 85 of finger receptacle 80 defines an opening 81, through which an index finger can extend. After it has been cut or terminated, the end 85 of finger receptacle 80 is finished to prevent unraveling or separation of the end 85. Similarly, thumb receptacle 88 is terminated close to the base 91 of the thumb receptacle 88. The end 92 of thumb receptacle 88 defines an opening 89, through which a thumb can extend. After it has been cut, the end 92 of finger receptacle 88 is finished to prevent unraveling or separation of the end 92.

Referring to FIG. 4, a cross-sectional view of a portion of finger receptacle 22 is illustrated. The view shown in FIG. 4 is taken along the line "4"-"4" in FIG. 2. The internal portion of finger receptacle 22 is shown. The outer shell 50 includes an inner surface 52 that defines an interior region 54 of the finger receptacle 22. In this embodiment, the outer shell 50 has a constant material thickness. The thickness of tactility region or shell portion 44 is defined by the thickness of the outer shell 50. The inner shell 70 includes an inner surface 72 that defines an interior region 74 of the finger receptacle 80 of the inner shell 70.

In this embodiment, the receptacle 80 of the inner shell 70 is coupled to the outer shell 50 by stitching 90 which extends around the circumference of the end 85 and opening 81 of receptacle 80. In other embodiments, the stitching can be separate spaced apart stitches or tackings. Alternatively, the end 85 of receptacle 80 can be coupled or bonded to the inner surface 52 using an adhesive material.

The location at which the end of the inner shell receptacle 80 is coupled to or fastened down to the outer shell receptacle 60 defines the location of transition area or region 40. The end 85 forms a stepped configuration at the transition area 40. In various embodiments, the length of inner shell receptacle 80 can vary, which will result in different lengths of the tactility region 44.

While only the tactility region 44 of finger receptacle 22 is described above in detail, the tactility region 46 of the thumb receptacle 30, as defined by receptacles 68 and 88 of the outer shell 50 and inner shell 70, respectively, is constructed in a similar manner. For example, the end 92 of inner shell receptacle 88 is coupled to thumb receptacle 68 using stitching or an adhesive proximate to opening 89. In this embodiment, the thickness of tactility region or shell portion 46 is defined by the thickness of receptacle 68 of the outer shell 50.

As previously described, the difference in thickness of the material creating the tactility regions 44 and 46 is achieved through the use of two shells or shell portions 50 and 70 and only having one of the shells with material in the tactility regions 44 and 46. In other embodiments, the material thickness difference can be achieved in a different manner as described below.

Figure 6:
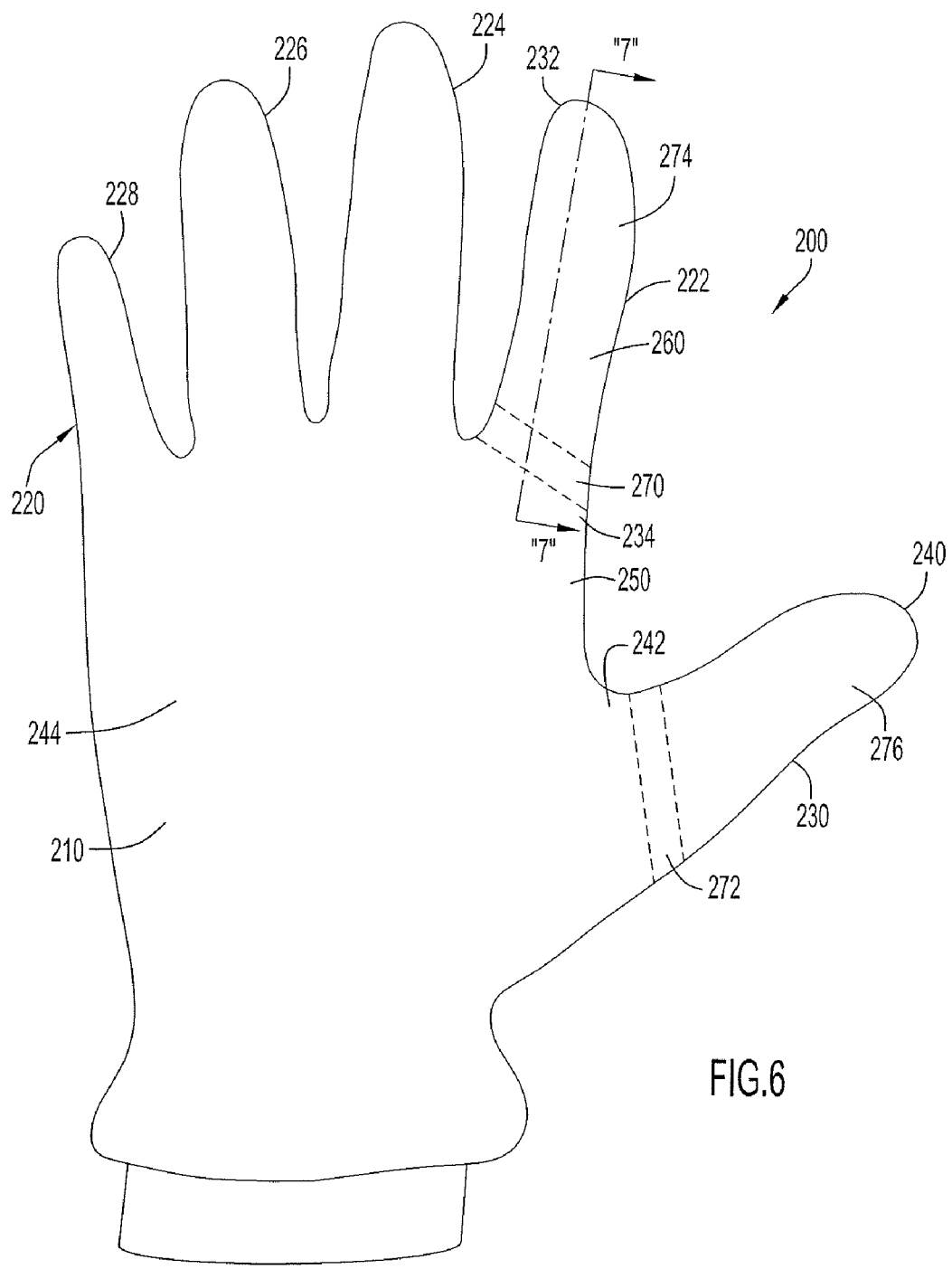
FIG. 6 is a bottom view of an alternative embodiment of a hand covering according to the present invention
Figure 7:
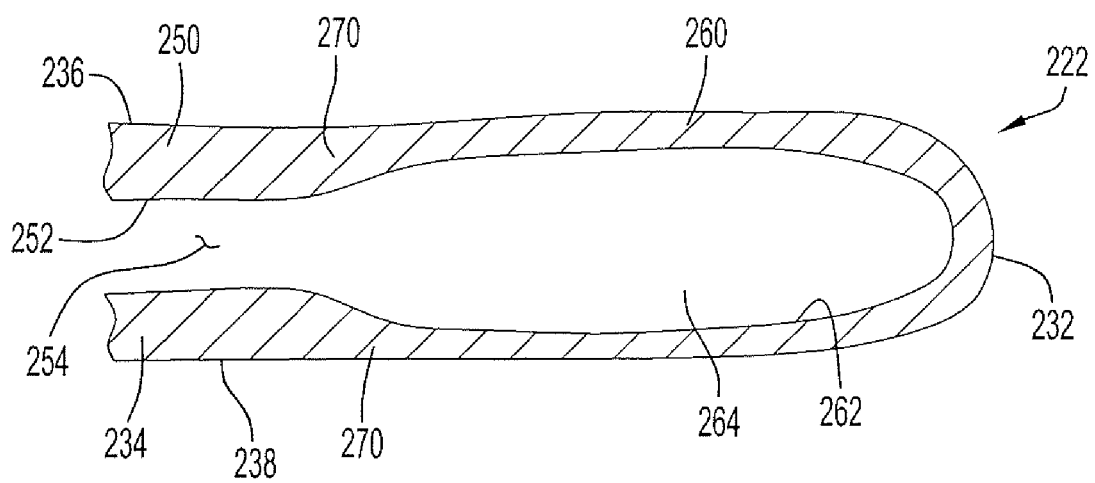
FIG. 7 is a cross-sectional side view of a portion of a finger receptacle of the hand covering illustrated in FIG. 6, taken along the line "7"-"7".

An alternative embodiment of a hand covering according to the present invention is illustrated FIGS. 6 and 7. In this embodiment, hand covering 200 includes a palm region 210, a finger region 220 including finger receptacles 222, 224, 226, and 228, and a thumb receptacle 230. Finger receptacle 222 and thumb receptacle 230 include tactility regions 274 and 276, respectively. Tactility region 274 is defined by a transition area 270 at one end and by the distal tip 232 of the finger receptacle 222 at the other end. Similarly, tactility region 276 is defined by a transition area 272 at one end and by the distal tip 240 of the thumb receptacle 230 at the other end. While not illustrated in FIG. 6, hand covering 200 may include one or more tactility components attached thereto.

Referring to FIG. 7, a cross-sectional view of finger receptacle 222 is illustrated. As shown, the hand covering 200 includes a first shell portion 250 that has a thickness and a second shell portion 260 that has a thickness less than that of the first shell portion 250. The first shell portion 250 includes an inner surface 252 that defines an interior region 254. Similarly, the second shell portion 260 includes an inner surface 262 that defines an interior region 264. The outer dimensions of the first shell portion 250 and the second shell portion 260 are the same. Accordingly, the difference in material thickness results in the interior region 254 of the first shell portion 250 being narrower than the interior region 264 of the second shell portion 260. The tactility and dexterity of the index finger in finger receptacle 222 is improved due to less material in the second shell portion 260. In this embodiment, the different shell portions with different thicknesses defined by the finger receptacle 222 and the body 244 of the hand covering 200 are integrally formed. Similarly, the different shell portions with different thicknesses defined by the thumb receptacle 230 and the body 244 of the hand covering 200 are integrally formed.

As shown in FIG. 7, the change in material thickness occurs at a transition area 270. The length of the transition area 270 can vary. In other words, the transition from the first shell portion 250 to the second shell portion 260 can be gradual and relatively smooth. Alternatively, it can be an abrupt step configuration, similar to the transition areas illustrated and described above with respect to hand covering 10.

The finger receptacle 222 includes a palm side 236, a back side 238 and a base 234. Similarly, thumb receptacle 230 includes a palm side, a back side, and a base 242.

Figure 8:
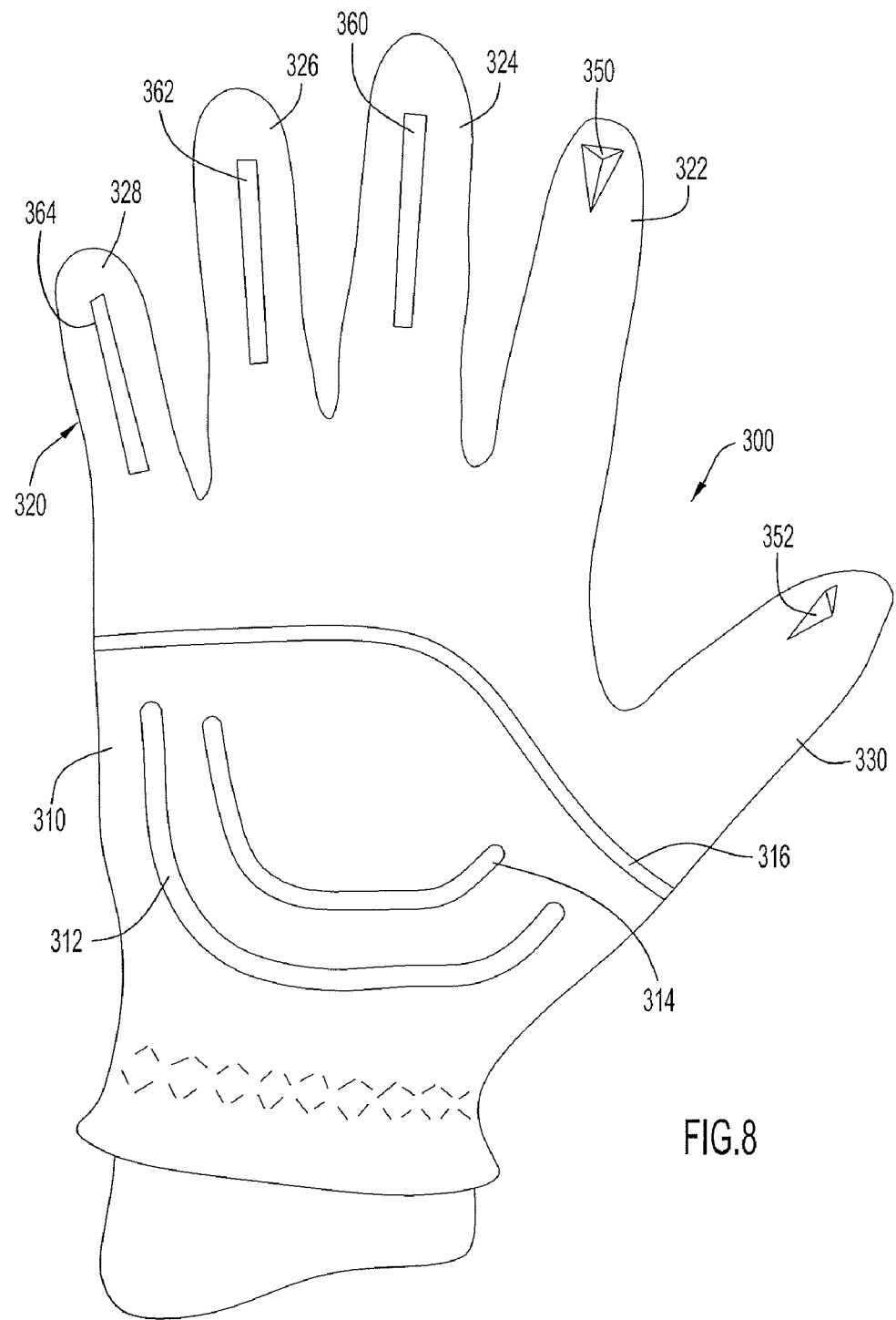
FIG. 8 is a bottom view of an alternative embodiment of a hand covering according to the present invention.

An alternative embodiment of a hand covering according to the present invention is illustrated in FIG. 8. In this embodiment, hand covering 300 includes a palm region 310, a finger region 320, and a thumb receptacle 330. The finger region 320 includes finger receptacles 322, 324, 326, and 328. Additionally, raised rubber molded articles 312, 314, and 316 can be coupled to palm region 310 to provide additional friction and gripping surfaces for the wearer of the hand covering 300. In an alternative embodiment, molded articles 312, 314, and 316 can be replaced by silicon gel prints that are coupled or adhered to the palm of the hand covering 300.

Hand covering 300 includes a tactility component 350 on finger receptacle 322 and a tactility component 352 on thumb receptacle 330. The shape and configuration of tactility components 350 and 352 are different than those of tactility components 100 and 110. Additional alternative embodiments of tactility components are illustrated in FIGS. 10-21 and described below.

Figure 9:
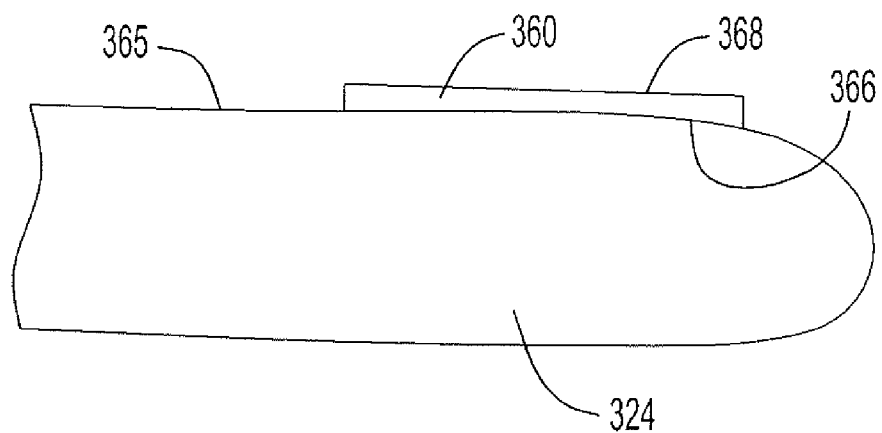
FIG. 9 is a side view of a portion of a finger receptacle of the hand covering illustrated in FIG. 8.

In this embodiment, hand covering 300 includes rectangular, elongate projections 360, 362, and 364 on finger receptacles 324, 326, and 328, respectively. The length of projections 360, 362, and 364 can vary. Referring to FIG. 9, a portion of finger receptacle 324 is illustrated. Projection 360 is coupled to the palm side 365 of the finger receptacle 324 and includes a bottom surface 366 and an upper or contact surface 368. In one embodiment, projections 360, 362, and 364 are raised rubber molded articles. In other embodiments, the projections can be formed of different materials.

Figure 10:
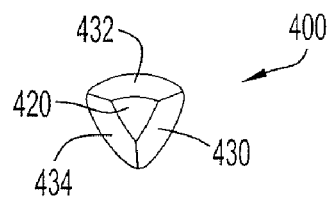
FIGS. 10 and 11 are top and side views, respectively, of an alternative embodiment of a tactility component according to the present invention.
Figure 11:
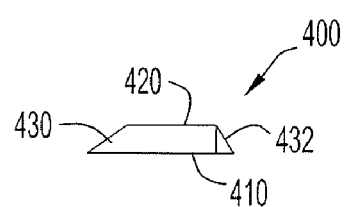

An alternative embodiment of a tactility component according to the present invention is illustrated in FIGS. 10 and 11. As shown, the shape of tactility component 400 is triangular and it resembles a slice of a pyramid. Component 400 can be referred to as a rounded triangle. In this embodiment, the tactility component 400 includes a bottom surface 410 and a top surface 420. Top surface 420 is flat and has a triangular shape. Component 400 has three side surfaces 430, 432, and 434 that extend between the bottom surface 410 and the top surface 420. The flat configuration of top surface 420 provides the wearer with a surface area that can be used to apply a force or pressure to an object. The bottom surface 410 is configured to be coupled to a finger receptacle using an adhesive material or any other type of coupling or bonding techniques. Component 400 enables the wearer to hit or engage many angles and surfaces without aiming.

Figure 12:
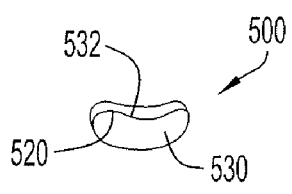
FIGS. 12 and 13 are top and side views, respectively, of an alternative embodiment of a tactility component according to the present invention.
Figure 13:
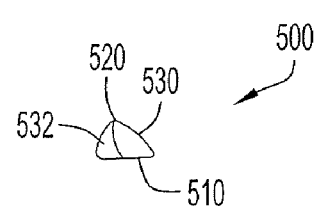

An alternative embodiment of a tactility component according to the present invention is illustrated in FIGS. 12 and 13. As shown, the overall shape of tactility component 500 is generally arcuate and it can be referred to as a curved fingertip shape. In this embodiment, the tactility component 500 includes a bottom surface 510 and two side surfaces 530 and 532 extending upwardly therefrom. The side surfaces 530 and 532 form a top edge 520 that is curved as illustrated in FIG. 12. Instead of a flat top surface as in component 400, the top edge 520 is a narrow, curved edge that provides a different point and type of engagement with an object. The configuration of component 500 wraps around a portion of the finger receptacle and enables the wearer to engage or hit an object from any direction.

Figure 14:
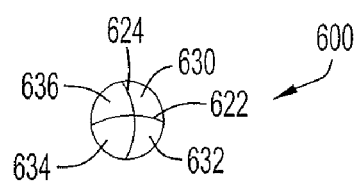
FIGS. 14 and 15 are top and side views, respectively, of an alternative embodiment of a tactility component according to the present invention.
Figure 15:
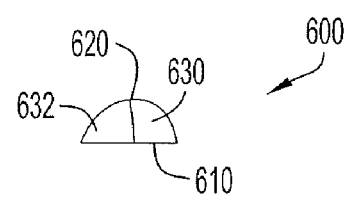

An alternative embodiment of a tactility component according to the present invention is illustrated in FIGS. 14 and 15. As shown, the overall shape of tactility component 600 is a hemisphere and it resembles a raised, round dot. Tactility component 600 includes a bottom surface 610 and four side surfaces 630, 632, 634, and 636 that are defined by edges 622 and 624. The intersection point of edges 622 and 624 form top point 620, which provides a single point of contact and the concentration of force from the wearer.

Figure 16:
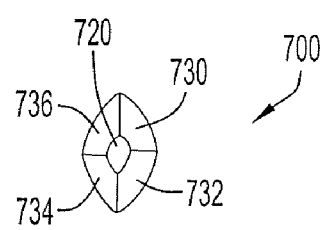
FIGS. 16 and 17 are top and side views, respectively, of an alternative embodiment of a tactility component according to the present invention.
Figure 17:
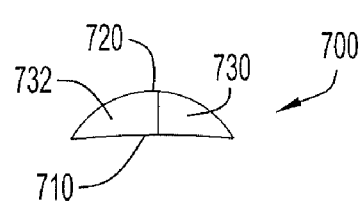

Another embodiment of a tactility component according to the present invention is illustrated in FIGS. 16 and 17. The overall configuration of tactility component 700 resembles a diamond shape. Tactility component 700 includes a bottom surface 710, a top surface 720, and four side surfaces 730, 732, 734, and 736 extending between the bottom surface 710 and the top surface 720. The top surface 720 is similar to top surface 420 of tactility component 400 (see FIGS. 10 and 11) in that it defines a flat surface area for the wearer of the hand covering 700 to contact an object. Top surface 720 has a diamond-shaped configuration. Component 700 can be applied or coupled to a finger receptacle vertically or horizontally.

Figure 18:
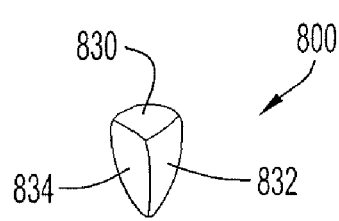
FIGS. 18 and 19 are top and side views, respectively, of an alternative embodiment of a tactility component according to the present invention.
Figure 19:
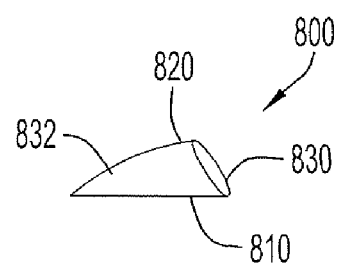

Another embodiment of a tactility component according to the present invention is illustrated in FIGS. 18 and 19. Tactility component 800 resembles a pyramid-like shape. Tactility component 800 includes a bottom surface 810 and three side surfaces 830, 832, and 834. The side surfaces 830, 832, and 834 collectively form a top point or tip 820. The tip 820 provides a single contact point that can be used to engage an object. Additionally, the side surfaces 830, 832, and 834 can accommodate all types of buttons.

Figure 20:
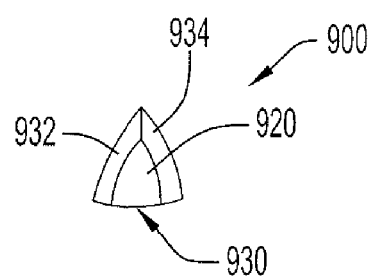
FIGS. 20 and 21 are top and side views, respectively, of an alternative embodiment of a tactility component according to the present invention.
Figure 21:
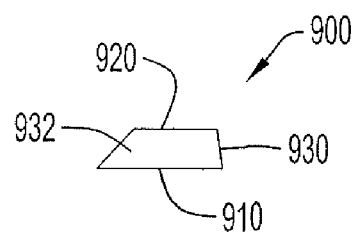

Another embodiment of a tactility component according to the present invention is illustrated in FIGS. 20 and 21. Tactility component 900 includes a bottom surface 910, a top surface 920, and three side surfaces 930, 932, and 934 that extend between the bottom surface 910 and the top surface 920. In this embodiment, side surfaces 932 and 934 are gradually sloped as they extend between the bottom surface 910 and the top surface 920. However, side surface 930 is substantially vertical, thereby allowing for the top surface 920 to have an increased surface area.

Figure 22:
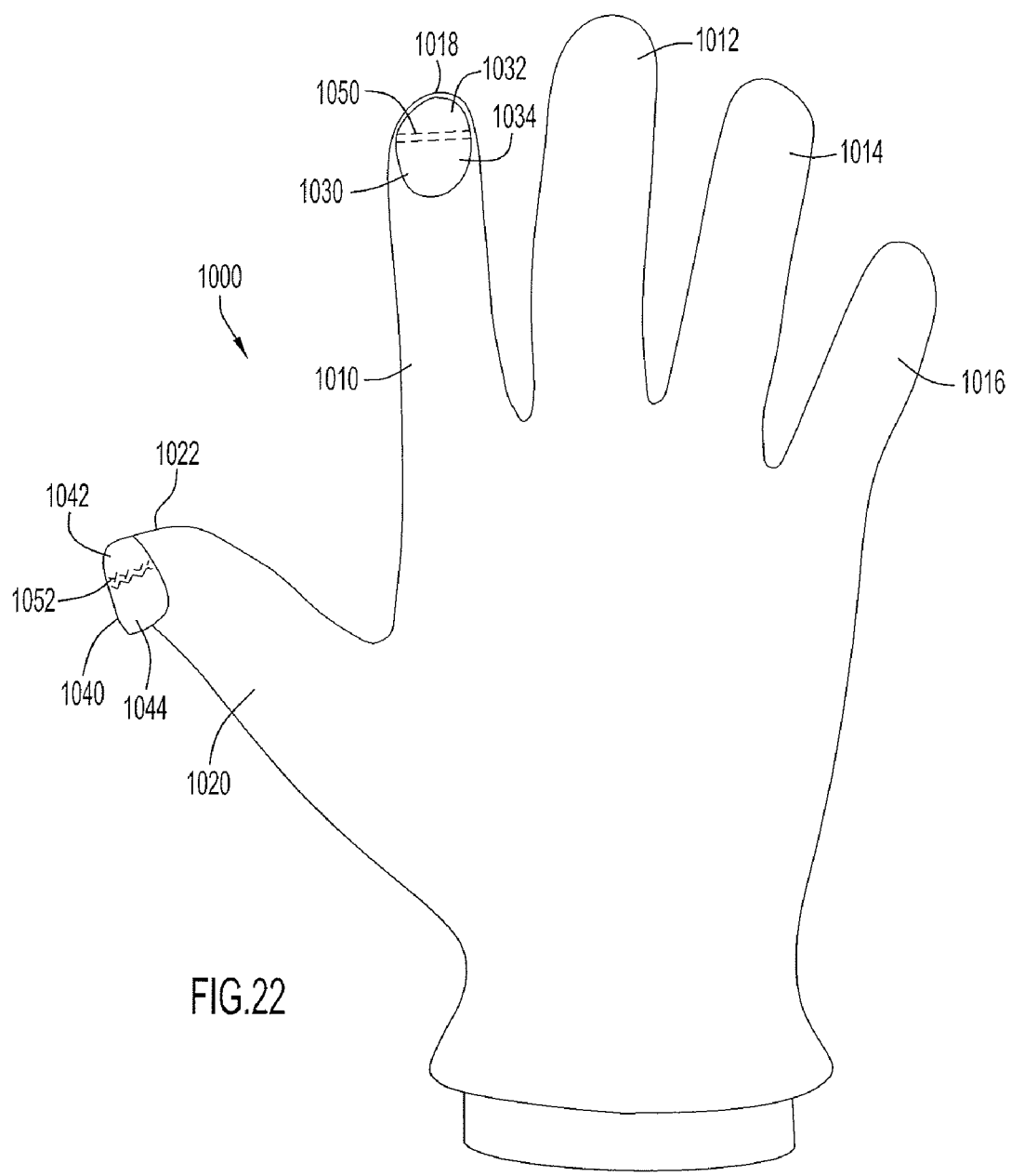
FIG. 22 is a bottom view of an alternative embodiment of a hand covering according to the present invention.

An alternative embodiment of a hand covering according to the present invention is illustrated in FIG. 22. In this embodiment, hand covering 1000 includes finger receptacles 1010, 1012, 1014, and 1016 and a thumb receptacle 1020. Finger receptacle 1010 includes a distal tip 1018 and thumb receptacle 1020 includes a distal tip 1022. Coupled proximate to distal tip 1018 on finger receptacle 1010 is a pull tab 1030. Pull tab 1030 is coupled by stitching 1050 that defines a fixed or coupled portion 1032 and a free portion 1034 that can be grasped by the wearer. Pull tab 1030 can be used to assist with the removal of finger receptacle 1010 from the corresponding finger of the wearer's hand. Similarly, coupled proximate to distal tip 1022 on thumb receptacle 1020 is a pull tab 1040. Pull tab 1040 is coupled by stitching 1052 that defines a fixed or coupled portion 1042 and a free portion 1044 that can be grasped by the wearer. Similar to pull tab 1030, pull tab 1040 can be used to assist with the removal of thumb receptacle 1020 and the hand covering 1000.

In other embodiments, pull tabs may be included on additional finger receptacles. Alternatively, pull tabs can be provided on any combination of the thumb receptacle and finger receptacles of a hand covering. The pull tabs can be utilized on a hand covering that includes one or more tactility components. Alternatively, the pull tabs can be utilized on a hand covering that includes one or tactility regions with a reduced thickness of the material in the region or regions.

In other embodiments, any combination of finger receptacles and a thumb receptacle of a hand covering may include tactility areas or regions. Similarly, any combination of finger receptacles and the thumb receptacle may include a tactility component either in addition to or in lieu of a tactility area or region.

In various embodiments, the size of the tactility components or projections can vary. In one embodiment, each tactility projection can have a width of 5 millimeters and a height of 1.5 millimeters. In other embodiments, the width and/or the height of the tactility projections can vary, depending on the desired shape and configuration.

In alternative embodiments, different materials can be included as part of or for an entire finger receptacle or thumb receptacle. Some materials that can be used include thin materials, conductive materials, hard plastics, molder rubber, and thermal plastic rubber materials.

Several additional embodiments of hand coverings are now discussed. In some of these embodiments, the hand coverings include a portion of conductive material. The conductive material is configured to transfer a charge from the hand covering and the user to an interface on an electronic device. Such hand coverings can be used with electronic devices with capacitive-type systems that require a conductive input to register a touch by a user.

Figure 23:
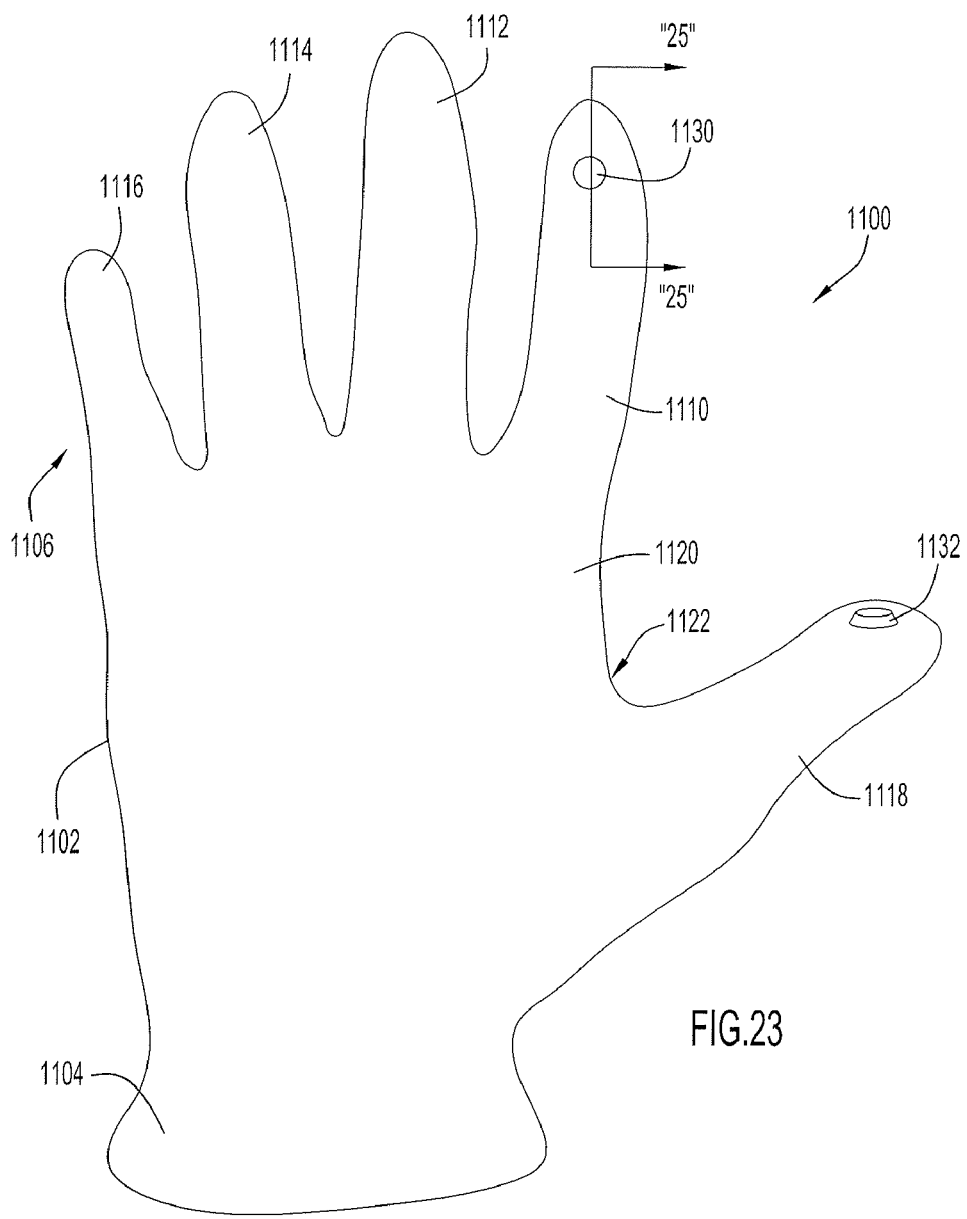
FIG. 23 is a front view of an alternative embodiment of a hand covering.

An embodiment of a hand covering is illustrated in FIG. 23. In this embodiment, the hand covering 1100 includes a shell with a palm or palmar region or section or portion 1102, a cuff portion 1104 and a finger region 1106. The shell includes a palm side 1120 proximate to the palm of a wearer's hand and a back side 1122 proximate to the back of a wearer's hand. The finger region 1106 includes several finger receptacles 1110, 1112, 1114, and 1116 and a thumb receptacle 1118 in which a user can insert the user's fingers and thumb. Each of the receptacles includes a tip or distal end. The shell has a proximal end opposite to end, at the cuff portion.

Hand covering 1100 includes a projection 1130 that is associated with finger receptacle 1110. In this embodiment, the finger receptacle 1110 is engaged by the forefinger of the wearer of the hand covering 1100. As will be described below, the projection 1130 is configured to be used to interact with a control portion of an electronic device. In this embodiment, hand covering 1100 includes another projection 1132 on thumb receptacle 1118. Each of the projections 1130 and 1132 can include a portion of conductive material associated therewith so that a user can effectively contact a capacitive-type sensing system on an electronic device. Thus, when one of the projections 1130 and 1132 touches or is placed proximate to a conductive touch-sensing input, the conductive material effectively transfers a charge to the capacitive touch-sensing interface. The user can then move the finger or thumb associated with the projection 1130 or 1132 and provide the desired input to the device without removing any part of the hand covering.

In one embodiment, the conductive portion of the hand covering 1100 is located on the palmar side of a finger receptacle. This location of the conductive portion facilitates the use of the finger receptacle by the user to manipulate an electronic device. In alternative embodiments, hand coverings may include multiple conductive portions that are located at different locations on the hand covering.

The hand covering, and the hand coverings described herein, can be made of one or more different materials. For example, an outer layer on a palm side of a hand covering can be a polyurethane material that extends along the palm side and wraps around a distal end of the hand covering. The outer layer on the back side can be a nylon material that is coupled to the polyurethane material. In other embodiments, other synthetic or natural materials, such as leather, wool, nylon, etc., can be used for the one or more pieces that form the layers of the hand covering.

Figure 24:
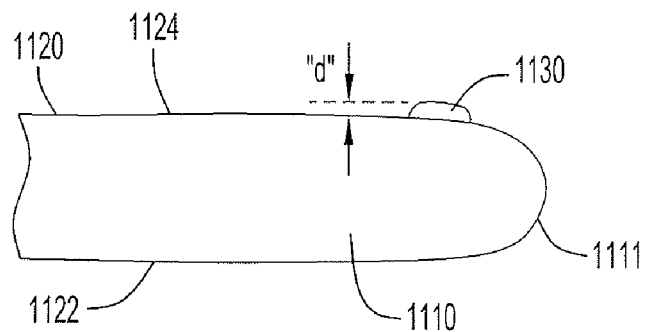
FIG. 24 is a side view of a finger receptacle of the hand covering illustrated in FIG. 23.

Referring to FIG. 24, a side view of finger receptacle 1110 is illustrated. The finger receptacle 1110 has a palm side 1120, a back side 1122, and a distal end 1111. As illustrated, the projection 1130 extends a distance "d" above the outer surface 1124 of the finger receptacle 1110. In various embodiments, the distance "d" can vary and be any amount, provided that the projection 1130 extends beyond the outer surface 1124 or profile of the finger receptacle 1110. The extension of the projection 1130 above the outer surface facilitates the engagement with an interface.

Figure 25:
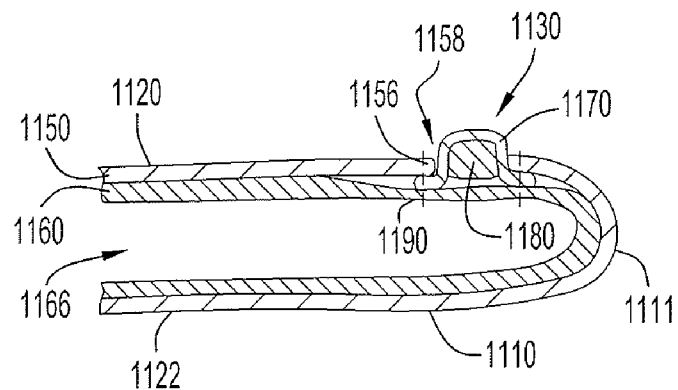
FIG. 25 is a cross-sectional side view of a finger receptacle of the hand covering illustrated in FIG. 23, taken along the line "23-23."
Figure 26:
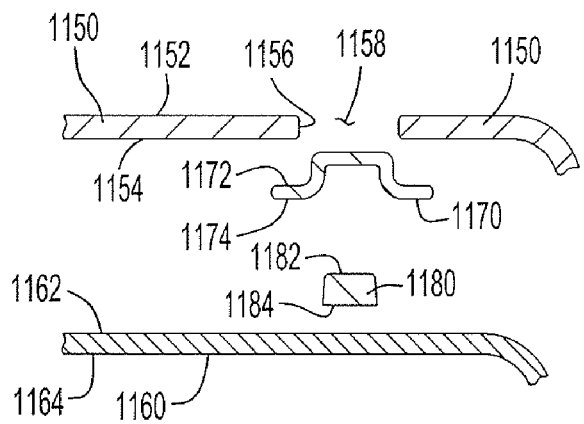
FIG. 26 is an exploded side view of some of the components of the finger receptacle illustrated in FIG. 25.

Referring to FIG. 25, a cross-sectional side view of the finger receptacle 1110 is illustrated. The cross-sectional side view in FIG. 25 is taken along the line "25-25" in FIG. 23. Referring to FIG. 26, portions of some of the components of the finger receptacle 1110 illustrated in FIG. 25 are shown in an exploded arrangement.

In FIG. 25, the components of the shell of this embodiment of the hand covering 1110 are illustrated. The finger receptacle 1110 includes an outer layer or portion 1150 that extends on the palm side 1120 and the back side 1122 of the finger receptacle 1110. In this embodiment, the outer layer 1150 is illustrated as being a single layer of material. However, in other embodiments, the outer layer 1150 on the palm side 1120 of the finger receptacle 1110 can be a different material than the outer layer 1150 on the back side 1122 of the finger receptacle 1110. For example, the outer layer 1150 on the palm side 1120 can be a polyurethane material that extends along the palm side 1120 of receptacle 1110 and wraps around the distal end 1111. The outer layer 1150 on the back side 1122 can be a nylon material that is coupled to the polyurethane material. In other embodiments, other materials, such as leather, wool, nylon, etc., can be used for the one or more pieces that comprise the outer layer 1150.

The outer layer 1150 includes an outer surface 1152 and an inner surface 1154. The outer layer 1150 includes an opening 1158 formed therethrough that is defined by an edge 1156. The opening 1158 can be formed in the outer layer 1150 in various ways and methods. For example, the opening 1158 can be die cut in the outer layer 1150 with a die or punch device. While the opening 1158 is illustrated as being substantially circular, in other embodiments, the opening 1158 can have another shape or configuration.

In this embodiment, the hand covering 1100 includes an inner layer 1160. The inner layer 1160 has an outer surface 1162 and an inner surface 1164 that defines an interior region 1166. In other embodiments, the hand covering 1100 may include one or more inner layers, such as a layer of insulation, in addition to inner layer 1160.

As shown in FIGS. 25 and 26, the hand covering 1100 includes a projection 1130. The projection 1130 includes a conductive member 1170 with an inner surface 1174 and an outer surface 1172. The conductive member 1170 can be referred to alternatively as an actuating member, actuator, conductive portion, or conductor.

In this embodiment, the conductive member 1170 is a layer of flexible conductive material. The conductive material is constructed so that it generates and/or maintains an electric charge, such as static electricity. When a user moves the conductive member 1170 in contact with or proximate to an electronic device with a capacitive-type interface, the conductive member 1170 transfers the required charge to the interface for an input. In one embodiment, the conductive member 1170 is formed of a conductive material, such as XT15 material (having a material composition of 90% polyester and 10% carbon) that is available from Apex Mills. In other embodiments, the quantity of conductive fibers and/or the content of the conductive materials can vary. Alternatively, additional conductive material, such as additional carbon material or other conductive fiber material, can be added to conductive member 1170.

In this embodiment, the hand covering 1100 includes an insert or component 1180 that is used so that the conductive member 1170 extends outwardly from the outer surface 1124 of the finger receptacle 1100. In one embodiment, the insert 1180 is formed of a material that has no or minimal grounding properties and that does not absorb the static electricity or electrical charge present in conductive member 1170. For example, the insert 1180 can be formed of ethylene-vinyl acetate (EVA). In other embodiments, the insert 1180 can be made of a conductive material, such as metal or a molded article with conductive particles therein.

The size and configuration of the insert 1180 can vary in different embodiments of hand coverings. The insert 1180 can be cylindrical or substantially cylindrical with tapered sides. Alternatively, the insert 1180 can be hemispherical or have a rounded outer surface. Referring to FIGS. 25 and 26, the insert 1180 has an outer surface 1182 and an inner surface 1184. The shape or configuration of the outer surface 1182 determines the outer shape or profile of the projection 1130. As shown in FIG. 25, the insert 1180 is sized and configured so that it can extend through the opening 1158 formed in the outer layer 1150.

Figure 27:
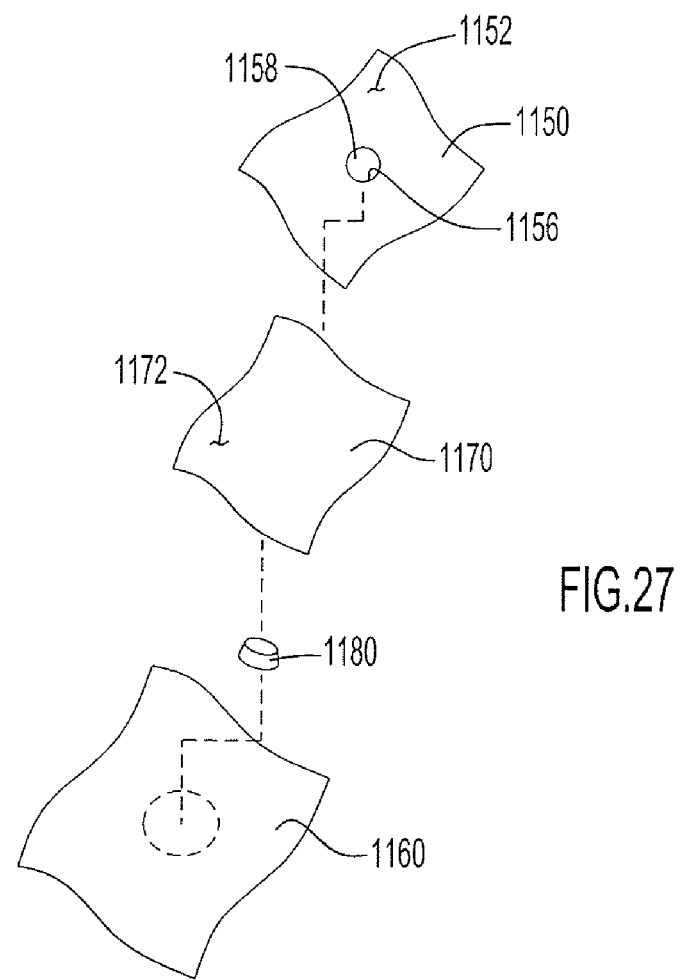
FIG. 27 is an exploded perspective view of the components of the finger receptacle illustrated in FIG. 26.

Referring to FIGS. 25-27, one method of assembly of the components of finger receptacle 1110 is discussed. For ease of reference, only portions of the outer layer 1150, the inner layer 1160, and the conductive member 1170 are illustrated in FIG. 27. The insert 1180 is positioned so that it engages the inner surface 1174 of the conductive member 1170. Since the conductive member 1170 is formed of a flexible fabric material, the conductive member 1170 can conform to the configuration of the insert 1180. The insert 1180 is moved into engagement with the opening 1158 so that a portion of the conductive member 1170 extends outwardly beyond the outer surface 1124 of the finger receptacle 1110.

The inner layer or liner 1160 is inserted into the interior region or receptacle defined by the outer layer 1150. The outer surface 1162 of layer 1160 is positioned proximate to the inner surface 1154 of the outer layer 1150 and the inner surface 1184 of the insert 1180. At this point, the outer layer 1150, the inner layer 1160, and the conductive member 1170 are coupled together. In one embodiment, layers 1150 and 1160 and conductive member 1170 are coupled together using stitching 1190. In other embodiments, different methods or techniques of coupling can be used to couple layers 1150 and 1160 and conductive member 1170. When they are coupled, the insert 1180 is retained in a particular position relative to the other parts of the finger receptacle 1110.

As described with respect to finger receptacle 1110, the outer layer 1150, the inner layer 1160, and the combination of the conductive member 1170 and insert 1180 form projection 1130. A similar combination of the outer layer 1150, the inner layer 1160, a conductive member and an insert can be used to form the projection 1132 on the thumb receptacle 1118.

While hand covering 1100 is illustrated as having multiple finger receptacles 1110, 1112, 1114, and 1116, the arrangement of the outer layer 1150, the inner layer 1160, the conductive member 1170, and the insert 1180 can be utilized in a hand covering that has a single finger receptacle, such as a mitten. The projection 1130 can be disposed at an appropriate location on the finger receptacle so that the wearer of the hand covering can utilize the projections 1130 and 1132 to contact an item or control a device.

Figure 28:
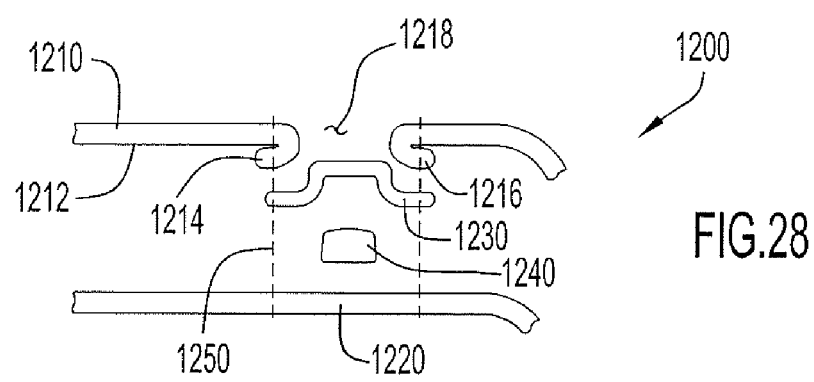
FIG. 28 is an exploded side view of some of the components of a finer receptacle of another embodiment of a hand covering.
Figure 29:
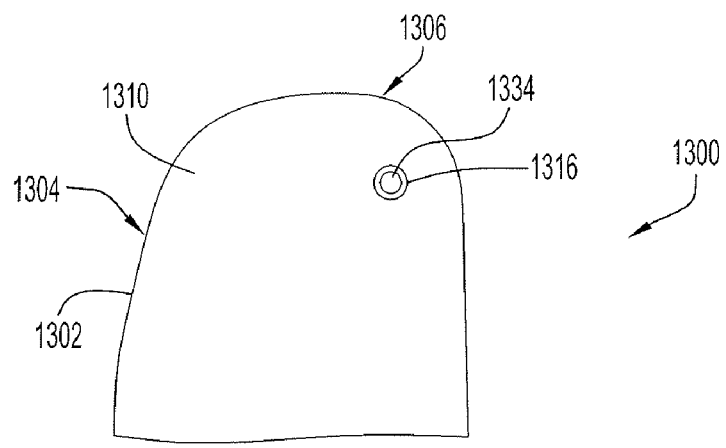
FIG. 29 is a front view illustrating a portion of an alternative embodiment of a hand covering.

An alternative embodiment of some components of a finger receptacle are illustrated in FIG. 28. In this embodiment, finger receptacle 1200 includes an outer layer 1210, an inner layer 1220, an conductive member 1230, and an insert 1240. As shown, the outer layer 1210 includes end portions 1214 and 1216 that are folded back and placed proximate to the inner surface 1212. The folded over end portions 1214 and 1216 define an opening 1218, which can be substantially circular or alternatively another shape. The end portions 1214 and 1216 can be coupled to the conductive member 1230 and inner layer 1220 with stitching 1250.

An alternative embodiment of a hand covering is illustrated in FIGS. 29-32. In this embodiment, the hand covering 1300 includes a shell 1302 with a finger receptacle 1304 and a forefinger region or area 1306. The shell 1302 includes an outer layer 1310 that is formed of polyurethane. The outer layer 1310 has an outer surface 1312 and an opening 1316 that is defined by an edge 1314. The opening 1316 extends through the outer layer 1310.

Figure 30:
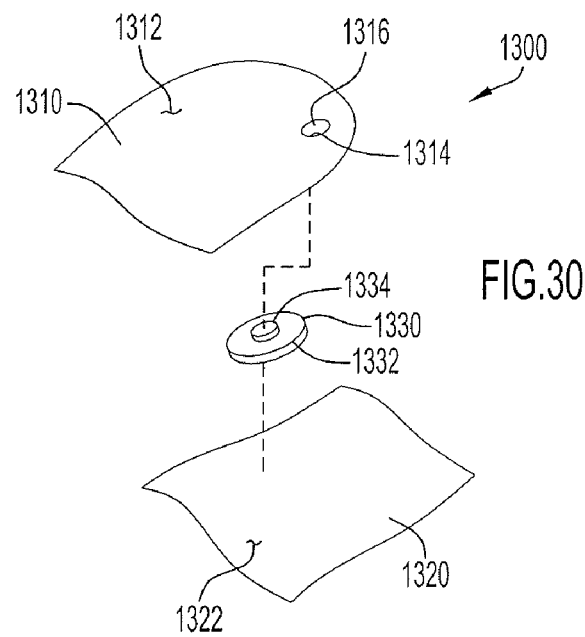
FIG. 30 is an exploded perspective view showing some of the components of the hand covering illustrated in FIG. 29.

Referring to FIG. 30, the hand covering 1300 includes an inner layer 1320 with an outer surface 1322. An insert 1330 is disposed between the outer layer 1310 and the inner layer 1320. The insert 1330 can be coupled to one or both of the outer layer 1310 and the inner layer 1320. For example, the insert 1330 can be sewn to, adhered to, and/or bonded to outer layer 1310 and/or inner layer 1320.

The insert 1330 includes a body 1332 and a projection 1334 that extends from the body 1332. While the body 1332 has a substantially circular perimeter and configuration, in other embodiments, the body can have different shapes or configurations.

Figure 31:
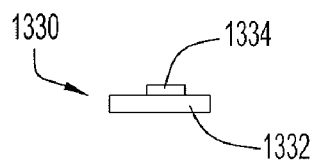
FIG. 31 is a side view of an embodiment of a contact member.
Figure 32:
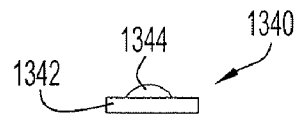
FIG. 32 is a side view of an alternative embodiment of a contact member.

Referring to FIGS. 31 and 32, different embodiments of inserts are illustrated. Insert 1330 includes a body 1332 and a projection 1334 that is substantially cylindrical. Insert 1340 includes a body 1342 and a projection 1344 that is rounded or substantially hemispherical. In one embodiment, the insert 1330 is a molded article with the body 1332 and projection 1334 integrally formed. For example, the insert 1330 can be formed of a polyurethane material. In another embodiment, the body 1332 and the projection 1334 can be formed separately and subsequently coupled together.

The projections 1334 and 1344 are configured so that the projection 1334 or 1344 can extend through the opening 1316 in the outer layer 1310. The height or distance that the projection 1334 or 1344 extends outwardly from the outer surface 1312 can vary. The extension of the projections enables the user to contact an item, such as a button or switch on an electronic device.

Figure 33:
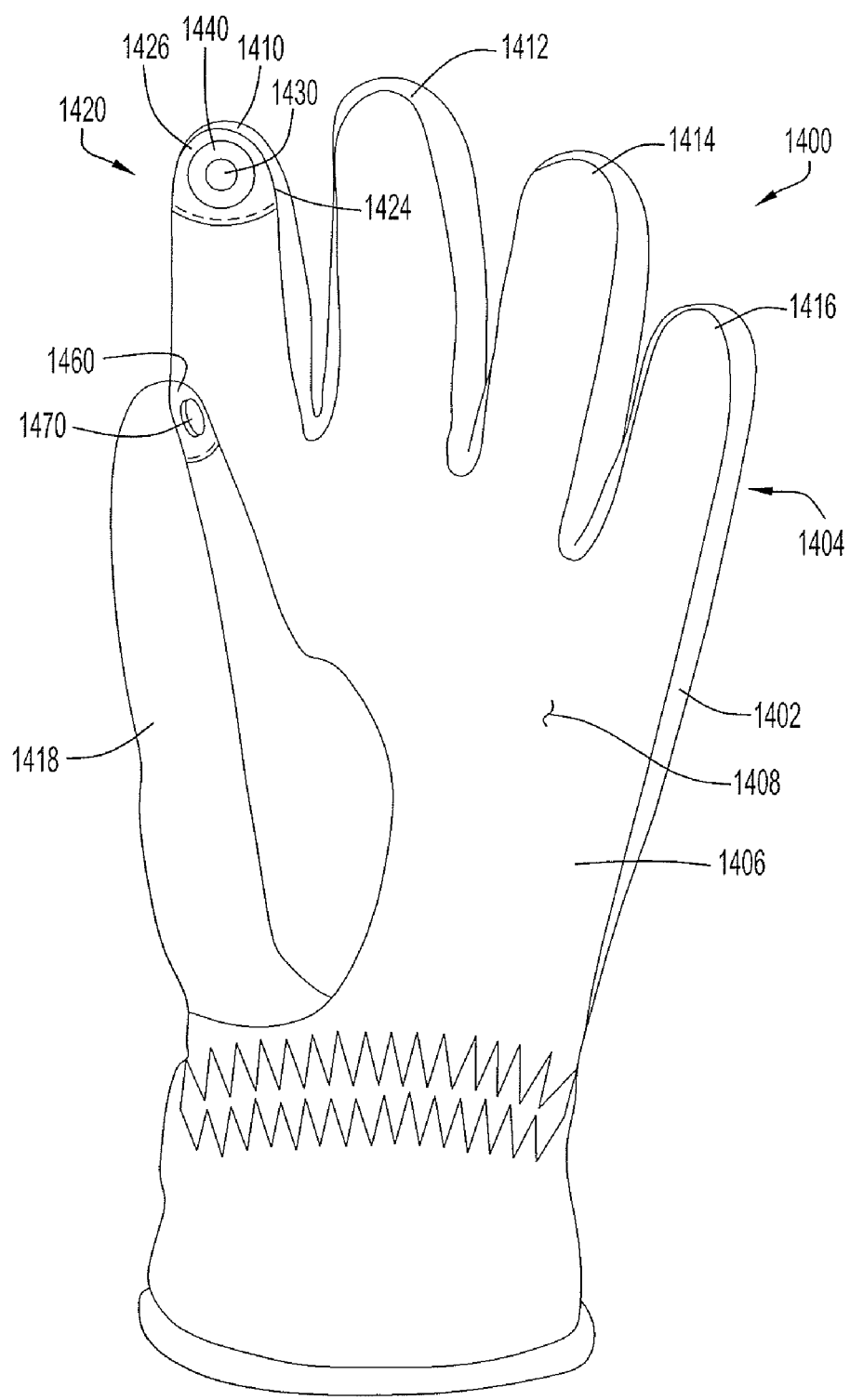
FIG. 33 is a front view of an alternative embodiment of a hand covering.
Figure 34:
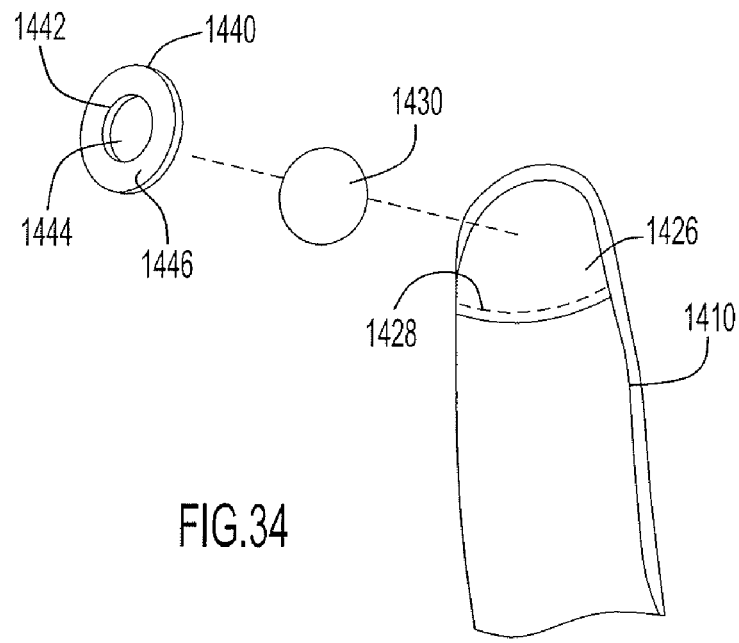
FIG. 34 is an exploded perspective view of some components of the hand covering illustrated in FIG. 33.

Referring to FIGS. 33 and 34, another embodiment of a hand covering is illustrated. In this embodiment, the hand covering 1400 is configured for use with a device that has a capacitive-type interface that requires a conductive input.

The hand covering 1400 includes a shell 1402 with a finger region 1404 and a palm region 1406. The palm region 1406 includes a palm side 1408 of the hand covering 1400 as shown in FIG. 33. The hand covering 1400 includes several finger receptacles 1410, 1412, 1414, and 1416 and a thumb receptacle 1418.

The hand covering 1400 includes a control portion or actuator portion 1420 that is formed on finger receptacle 1410. The actuator portion 1420 includes conductive material 1430 and a mounting structure 1440. The conductive material 1430 is a flexible fabric material, such as XT15 identified above, that can be used to generate and/or maintain an electrical charge and transfer it to an interface. The conductive material 1430 can be utilized with an electronic device or other object that requires a conductive input. The conductive material 1430 can be the same material as conductive member 1170 described above.

The conductive material 1430 is coupled to the finger receptacle 1410 by the mounting structure 1440. In this embodiment, the mounting structure 1440 is a molded rubber or polyurethane article that has a substantially circular configuration. As shown in FIG. 34, the mounting structure 1440 includes an inner edge 1442 defining an opening 1444 and an outer surface 1446. The mounting structure 1440 can be coupled to the finger receptacle 1410 in several different ways. For example, the mounting structure 1440 can be bonded to the finger receptacle 1410 using an adhesive or a heat treatment method. Alternatively, the mounting structure 1440 can be coupled to the finger receptacle 1410 using stitching.

In one embodiment, the finger receptacle 1410 can include a piece of material 1426 that is coupled along seam 1424 and stitching 1428 to the other components of the finger receptacle 1410. The material 1426 can be used to facilitate the coupling of the mounting structure 1440.

In this embodiment, the hand covering 1400 includes an engaging member 1470 that is coupled to the thumb receptacle 1418. The engaging member 1470 is a molded plastic or rubber article, such as a silicon gel, that is coupled to a piece of material 1460 on the thumb receptacle 1418. The engaging member 1470 is configured so that a user can utilize the user's thumb to contact an object, such as a mechanical switch or button.

Figure 35:
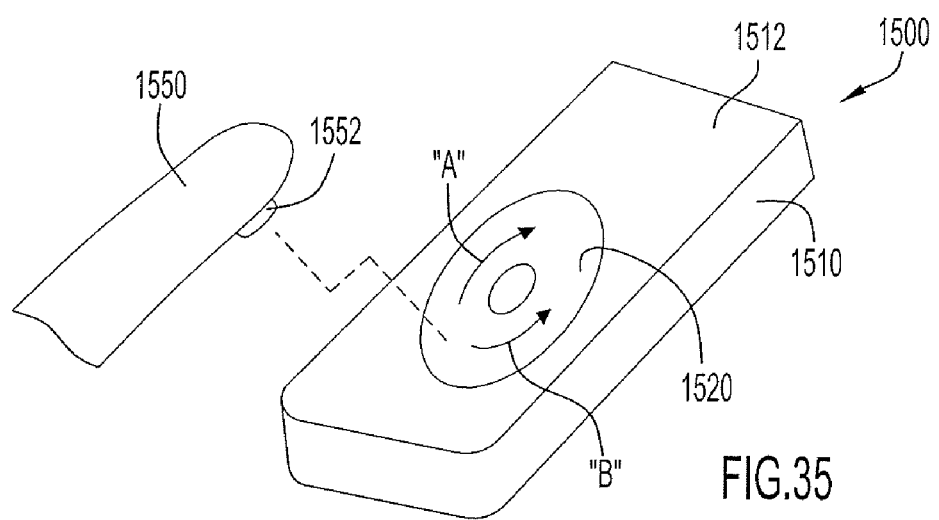
FIG. 35 is a perspective view of an exemplary electronic device and the hand covering illustrated in FIG. 23.
Figure 36:
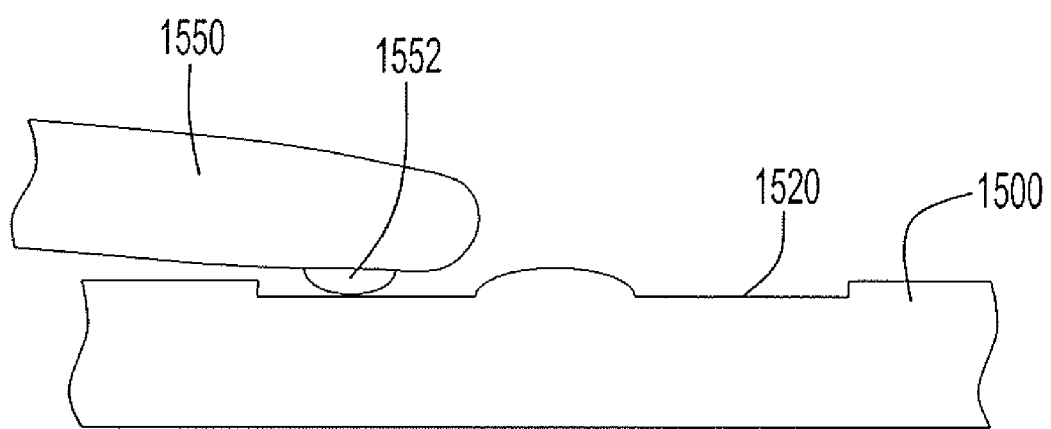
FIG. 36 is a side view of the interaction between the electronic device and the hand covering illustrated in FIG. 35.

Referring to FIGS. 35 and 36, an exemplary usage of a hand covering is illustrated. For ease of reference, only a finger receptacle 1550 of a hand covering is illustrated. It is to be understood that the shape or configuration of the finger receptacle can vary and that a thumb receptacle can be utilized as well.

Finger receptacle 1550 includes a conductive portion or member 1552. Conductive portion 1552 can be similar to projection 1130 of hand covering 1100 which included conductive member 1170 and insert 1180. Alternatively, conductive portion 1552 can be similar to conductive member 1430 of hand covering 1400.

In FIG. 35, an exemplary electronic device 1500 is illustrated. Electronic device 1500 includes a housing 1510 with a surface 1512 that can include a display or display screen. The housing 1510 includes a control portion 1520 which, in this embodiment, is controlled or actuated by an electrical charge or static electricity.

The wearer of the hand covering can move the finger receptacle 1550 toward electronic device 1500 so that the conductive member 1552 is proximate to control portion 1520. In one embodiment, it is not necessary that conductive member 1552 contacts the control portion 1520. Provided that there is static electricity or an electrical charge present in conductive member 1552, the movement of member 1552 along the direction of arrow "A" or arrow "B" in FIG. 35 will generate inputs to the control portion 1520 and thereby serve as a user input to the electronic device 1500. Such an input may be to select one or more audio and/or video outputs, to change the characteristics of the audio and/or video outputs from the device 1500, and/or to interact with a program operating on the device 1500. Referring to FIG. 36, the conductive member 1552 is illustrated as being in contact with the control portion 1520 of the device 1500.

Figure 37:
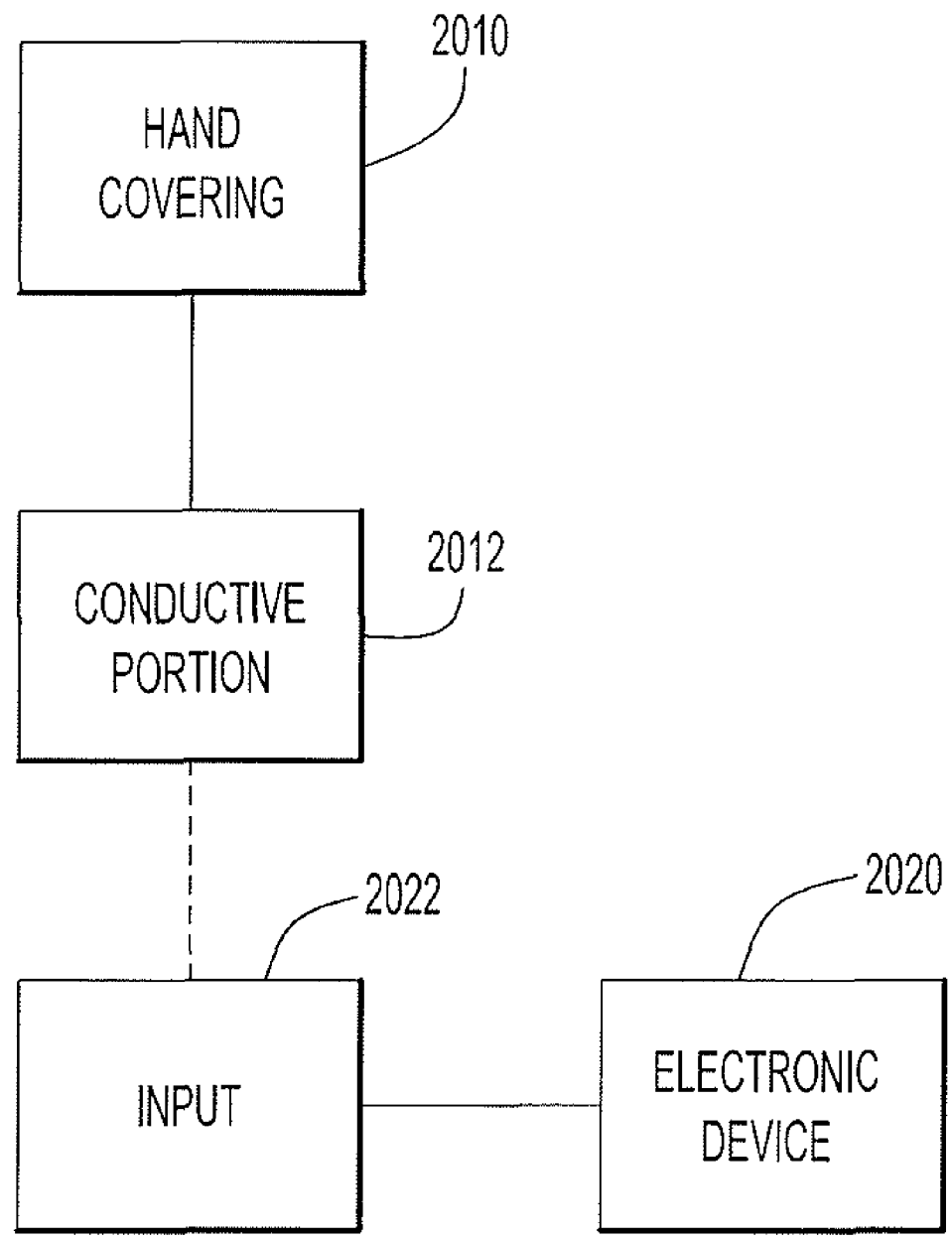
FIG. 37 is a schematic block diagram of an embodiment of a hand covering that can be used with an electronic device.

A schematic block diagram of an alternative embodiment of a hand covering according to the invention is illustrated in FIG. 37. Generally, the hand covering 2010 can include a shell or shell assembly that has a palm portion or region and several receptacles for fingers and a thumb. The hand covering 2010 includes a conductive portion 2012 which may be placed at any location on the hand covering 2010. The conductive portion 2012 is an electrically conductive material. The conductive material can be a flexible fabric material that can be used to maintain an electrical charge and transfer it to an interface. The conductive material can be utilized with an electronic device or other object that requires a conductive input. The conductive portion of a hand covering provides an electrical connection between a user's finger and the outer surface of a shell of the hand covering.

The conductive portion 2012 can be placed at a single location or can be placed at more than one location on the hand covering 2010. In one embodiment, the conductive portion 2012 can be formed as part of a shell of the hand covering 2010. Alternatively, the conductive portion 2012 can be formed separately and subsequently coupled to the shell. In one embodiment, the conductive material is configured to transfer a charge from the hand covering 2010 and the user to an interface on an electronic device. Such hand coverings 2010 can be used with electronic devices with capacitive-type systems that require a conductive input to register a touch by a user.

Referring to FIG. 1, the hand covering 2010 can be used with an electronic device 2020. As discussed above, there are various types of electronic devices being used for communications, entertainment, work productivity, etc. These various electronic devices 2020 can be used with the hand covering 2010. Some exemplary types of electronic devices 2020 are an iPod®, iPhone®, iTouch®, iPad® or Android mobile electronic devices.

In one implementation, the electronic device 2020 includes an input or input mechanism 2022. The input 2022 can be a capacitive-type input that a user can contact to provide an input to the electronic device 2020. Alternatively, input 2022 can be a resistive-type input as discussed above. Such capacitive-type and resistive-type inputs cannot be manipulated by a conventional hand covering worn by a user. In some cases, a charge from the user is required to be transmitted to the input 2022. Accordingly, the hand covering 2010 is configured to allow for the transmission of such a charge to the input 2022.

A user can use the hand covering 2010 to control and use the electronic device 2020 using the input 2022. In particular, the user can place the electrically conductive portion 2012 in contact with the input 2022 of the electronic device 2020. Provided that the conductive portion 2012 passes a charge from the user through to the input 2022, the user can control the electronic device 2020.

Figure 38:
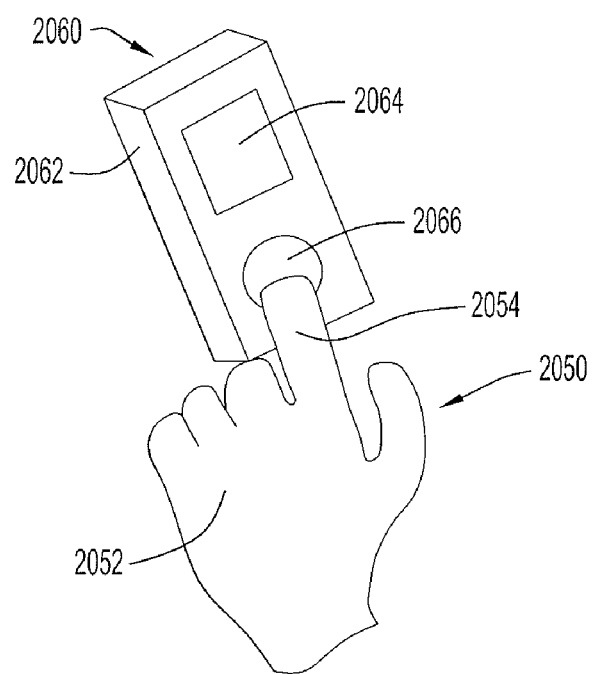
FIG. 38 is a perspective view of a hand covering being used with an electronic device.
Figure 39:
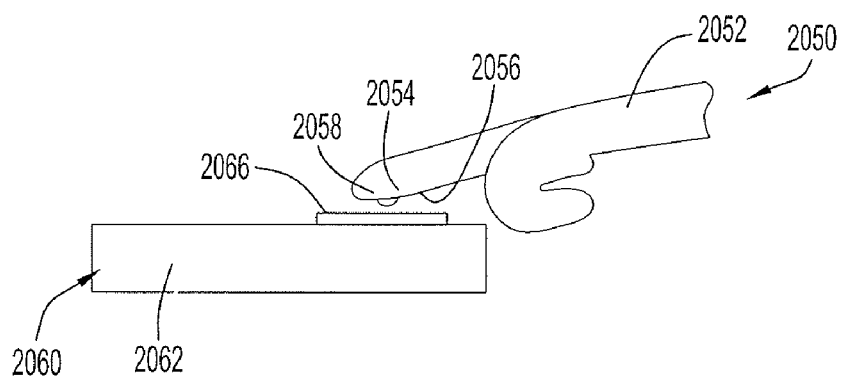
FIG. 39 is a side view of the hand covering and electronic device illustrated in FIG. 38.

Referring to FIGS. 37 and 38, a hand covering 2050 is illustrated in use with an electronic device 2060. The hand covering 2050 includes a shell 2052 with multiple finger receptacles 2054. The finger receptacle 2054 includes a surface 2056 from which a conductive portion 2058 extends. The conductive portion 2058 is a projection that extends from the finger receptacle 2054. In this embodiment, the electronic device 2060 includes a housing 2062 with a display 2064 and a control portion 2066. The control portion 2066 may be referred to alternatively as an input or input mechanism for the electronic device 2060. As shown, the conductive portion 2058 of the hand covering 2050 can be placed proximate to and/or in contact with the control portion 2066 of the electronic device 2060.

Referring to FIGS. 40-44, an embodiment of a hand covering with a conductive portion is illustrated. For ease of reference, only a portion of a finger receptacle of the hand covering is illustrated. It is to be understood that the remainder of the hand covering that includes finger receptacle 2110 also includes a shell with multiple finger receptacles, including a thumb receptacle. In one embodiment, the hand covering can be constructed similarly to the previously described hand covering 1100.

Figures 40, 41:
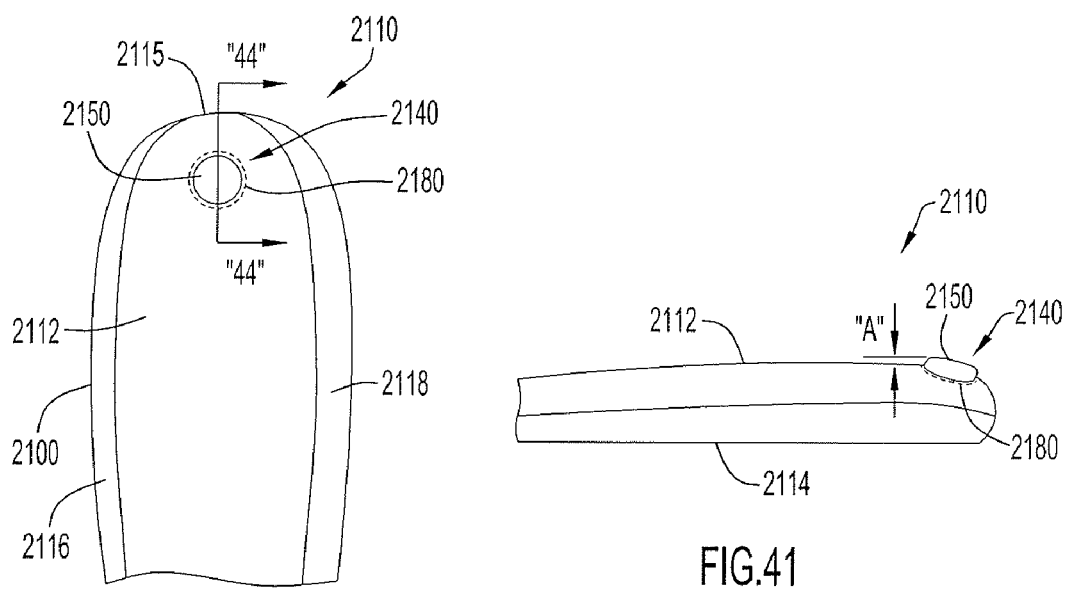
FIG. 40 is a palm side view of an embodiment of finger receptacle for a hand covering.
FIG. 41 is a side view of the finger receptacle illustrated in FIG. 40.

As shown in FIGS. 40 and 41, the finger receptacle 2110 of shell 2100 corresponds to the index finger of the wearer and includes a palm side or surface 2112 and a back side or surface 2114 that is opposite to surface 2112. The finger receptacle 2110 includes a tip or end 2115 that is distal relative to the cuff of the shell 2100. The finger receptacle 2110 also includes opposite sides 2116 and 2118 as shown in FIG. 40. In different embodiments, the particular length, width, and overall configuration of the finger receptacle 2110 can vary.

As shown, the finger receptacle 2110 includes a conductive portion 2140. The conductive portion 2140 allows a user to manipulate and interact with an electronic device. The conductive portion 2140, and the various conductive portion embodiments disclosed below, are mechanisms by which the electrical conductivity of a user's fingers may be transferred through one or more layers of material of the hand covering through the outer shell of the hand covering. The electronic conductive members or components of the conductive portions provide an electrical connection between the user's fingers and an electronic device.

In this embodiment, the conductive portion 2140 includes a conductive member 2150 that extends outwardly beyond the outer surface of the palm side 2112. The conductive member 2150 includes conductive material so that a user can effectively contact a capacitive-type sensing system on an electronic device. As shown, the conductive member 2150 is a projection that extends from the finger receptacle 2110. The conductive member 2150 is configured to be used to interact with a control portion of an electronic device. In particular, the conductive member 2150 extends a distance "A" from the palm side 2112 of the finger receptacle 2110. By extending outwardly from the palm side 2112, the conductive member 2150 can easily contact the control portion of an electronic device. The distance "A" can vary in different embodiments of hand coverings. The extension of the projection or conductive member 2150 above the outer surface facilitates engagement with a control portion or an interface. The conductive member 2150 is placed at a location where the user or wearer of the glove typically engages an object. For example, a person wearing a hand covering performs actions, such as pressing buttons, most often with his or her index finger and/or thumb.

Figure 42:
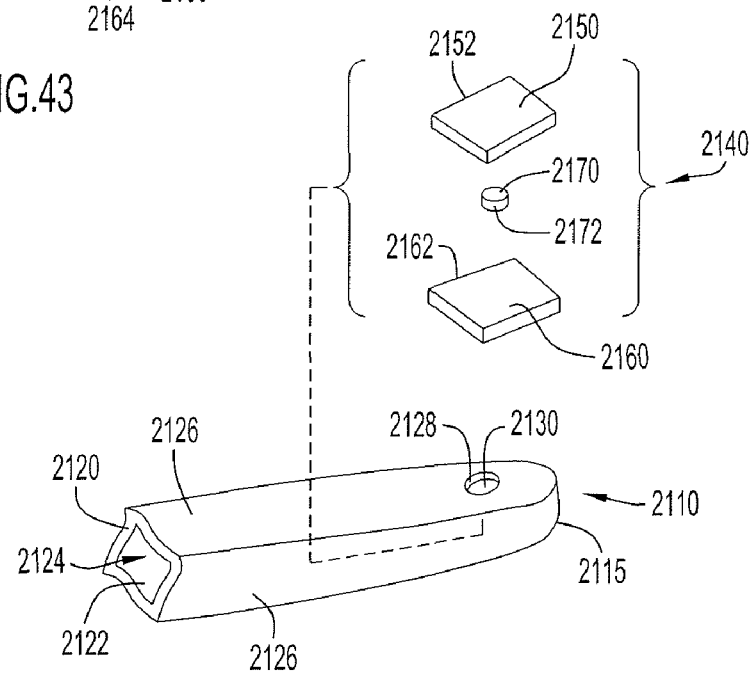
FIG. 42 is an exploded perspective view of the finger receptacle illustrated in FIG. 40.

Referring to FIG. 42, an exploded assembly view of the components of the finger receptacle 2110 is illustrated. The finger receptacle 2110, and its corresponding shell of the hand covering, includes a single layer of material 2120. In other words, the hand covering with finger receptacle 2110 is a single layer hand covering. The layer of material 2120 includes an inner surface 2122 that defines a receptacle or interior region 2124 in which a user may insert a finger. The layer 2120 also includes an outer surface 2126 that extends around the sides of the finger receptacle 2110.

Located along the palm side of the finger receptacle 2110 is an edge 2128 that defines an opening 2130. The opening 2130 can be formed in the layer 2110 in various ways and methods. For example, the opening 2130 can be die cut in the layer 2110 with a die or punch device. The opening 2130 extends through the layer 2120 from the outer surface 2126 to the inner surface 2122. The location of the opening 2130 is generally proximate to the distal tip or end 2115 of the finger receptacle 2110. In one embodiment, the opening 2130 may have a diameter of approximately 8 mm and the opening 2130 may be spaced from the distal tip 2115 approximately 5 mm. The size and shape of the opening 2130 can vary in different embodiments of finger receptacles.

Figure 44:
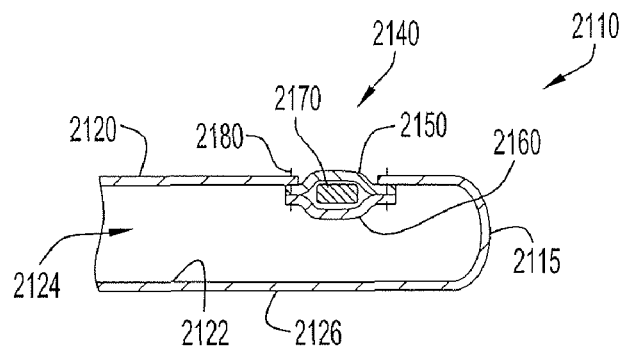
FIG. 44 is a cross-sectional side view of a portion of the finger receptacle illustrated in FIG. 40, taken along the line "44-44."
Figure 43:
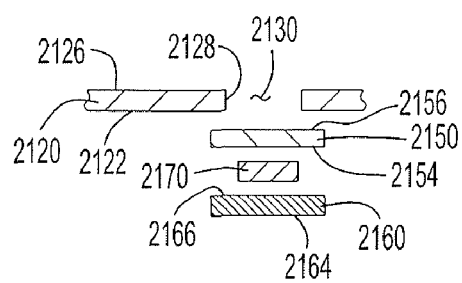
FIG. 43 is a partial cross-sectional exploded side view of some components of the finger receptacle illustrated in FIG. 40.

The various components of the conductive portion 2140 are illustrated in FIGS. 42-44. As shown in FIG. 42, the conductive portion 2140 includes two conductive members 2150 and 2160. The conductive portion 2140 also includes an insert 2170. Each of the conductive members 2150 and 2160 is a flexible piece of material that has conductive properties. In one embodiment, the conductive material may be a piece of fabric with conductive fibers or threads woven or inserted therein. For example, each of the conductive members 2150 and 2160 can be a silver-plated rip-stop material available from Deer Creek. In one embodiment, the conductive material maintains an electric charge, such as static electricity. When a user moves the conductive member 2150 in contact with or proximate to an electronic device with a capacitive-type interface, the conductive member 2150 transfers the required charge to the interface for an input.

In alternative embodiments, the conductive members 2150 and 2160 may be made of the same material or different material. In one embodiment, the conductive members 2150 are formed of a conductive material, such as XT15 material (having a material composition of 90% polyester and 10% carbon) that is available from Apex Mills. Alternatively, additional conductive material, such as additional carbon material or other conductive fiber material, can be added to conductive member 2150.

In one embodiment, the conductive members 2150 and 2160 can be the same size and shape. As shown, the conductive members 2150 and 2160 are squares having sides that are approximately one inch in length. Conductive member 2150 has an edge 2152 that extends around the perimeter of the conductive member 2150. Similarly, conductive member 2160 has an edge 2162 that extends around the perimeter of the conductive member 2160. While conductive members 2150 and 2160 are substantially square-shaped, in other embodiments, the shape or configuration of the members 2150 and 2160 can vary (such as circles, ovals, rectangles, etc.).

Referring to FIG. 42, an insert 2170 is placed between the conductive members 2150 and 2160. The insert 2170 has an outer edge 2172 extending therearound and has a substantially cylindrical shape. The insert 2170 is formed of material that has no or minimal grounding properties and that does not absorb the static electricity or electrical charge present in conductive members 2150 and 2160. In one embodiment, the insert 2170 may be made of a hard ethylene vinyl acetate (EVA) material and may be die-cut formed. In one embodiment, the insert 2170 has a diameter of 5 mm and a thickness of 2 mm. The diameter of the insert 2170 is selected to allow the conductive member 2150 to be projected through the opening 2130. In alternative embodiments, the insert 2170 may be a different shape and may have a different size. For example, the insert 2170 may have tapered sides, be hemispherical or have a rounded outer surface. In addition, the insert 2170 can be made of a conductive material, such as metal or a molded article with conductive particles therein.

The location of the conductive portion 2140 relative to the layer 2120 of finger receptacle 2110 is illustrated in an exploded arrangement in FIG. 43. The inner surface 2122 and the outer surface 2126 of the layer 2120 are shown with the opening 2130 extending through the layer 2120. Conductive member 2150 has opposite surfaces 2154 and 2156 with surface 2156 being located proximate to the inner surface 2122 of the layer 2120 of the finger receptacle 2110. Placed proximate to the inner surface 2154 of the conductive member 2150 is the insert 2170. On the other side of the insert 2170 is a conductive member 2160 that has opposite sides 2164 and 2166. Conductive member 2160 is oriented such that surface 2166 is placed proximate to the insert 2170 and the inner surface 2154 of conductive member 2150.

Referring to FIG. 44, a cross-sectional view of a portion of finger receptacle 2110 is illustrated. As shown, the conductive portion 2140 is coupled to the receptacle 2110 by stitching 2180. In particular, stitching 2180 passes through layer 2120 and the conductive members 2150 and 2160. As shown in FIG. 40, the stitching 2180 may extend around the perimeter of the opening 2130.

Referring back to FIG. 44, the insert 2170 is placed between the conductive members 2150 and 2160 and retained in that position by the stitching 2180. The insert 2170 causes a portion of the conductive member 2150 to extend beyond the outer surface 2126 of the layer 2120 when a user inserts a finger into the receptacle 2124. The part of the conductive portion 2140 that projects from the finger receptacle 2110 can be referred to alternatively as an actuating member, actuator, conductive portion, or conductor.

Accordingly, when a user inserts a finger into receptacle 2110, the user can use the conductive portion 2140 by pressing or contacting conductive member 2160, which in turn contacts the insert 2170 and the conductive member 2150. In this embodiment, the user's finger is in contact with conductive member 2160. When the projection or conductive member 2150 touches or is placed proximate to a conductive touch-sensing input, the conductive material effectively transfers a charge to the capacitive touch-sensing interface. The user can then move the finger or thumb associated with the conductive member 2150 and provide the desired input to the electronic device without removing any part of the hand covering.

In one embodiment, the insert 2170 is not made of a conductive material. The charge from the user's hand or finger passes through the conductive member 2160 to conductive member 2150. The charge can pass as the conductive members 2150 and 2160 are in contact with each other. In alternative embodiments, the insert 2170 can be made of a conductive material and/or the stitching 2180 can be a conductive fiber, thread, or wire. In other embodiments, the conductive members 2150 and 2160 can be coupled together using an adhesive, welding, or other coupling technique or mechanism.

Referring to FIGS. 45-50, an alternative embodiment of a finger receptacle for a hand covering is illustrated. In this embodiment, the hand covering includes a shell 2200 with several finger receptacles. For ease of reference, only finger receptacle 2210 is illustrated in FIGS. 45-50. It is to be understood that the other finger receptacles of the shell 2200 may be constructed similarly to finger receptacle 2210. Alternatively, the other finger receptacles of the shell 2200 may be different than finger receptacle 2210 as described below.

As shown in FIGS. 45 and 46, the finger receptacle 2210 includes a palm side or surface 2212, a back side or surface 2214 opposite to the palm side 2212, and two sides 2216 and 2218. The finger receptacle 2210 also includes a distal end or tip 2215. The finger receptacle 2210 also includes a conductive portion 2260. Conductive portion 2260 includes a conductive member 2270 that extends outwardly a distance "B" from the outer surface of the finger receptacle 2210. The distance "B" that the conductive member 2270 extends can be the same as or different than the distance "A" discussed above relative to FIG. 6.

Figure 47:
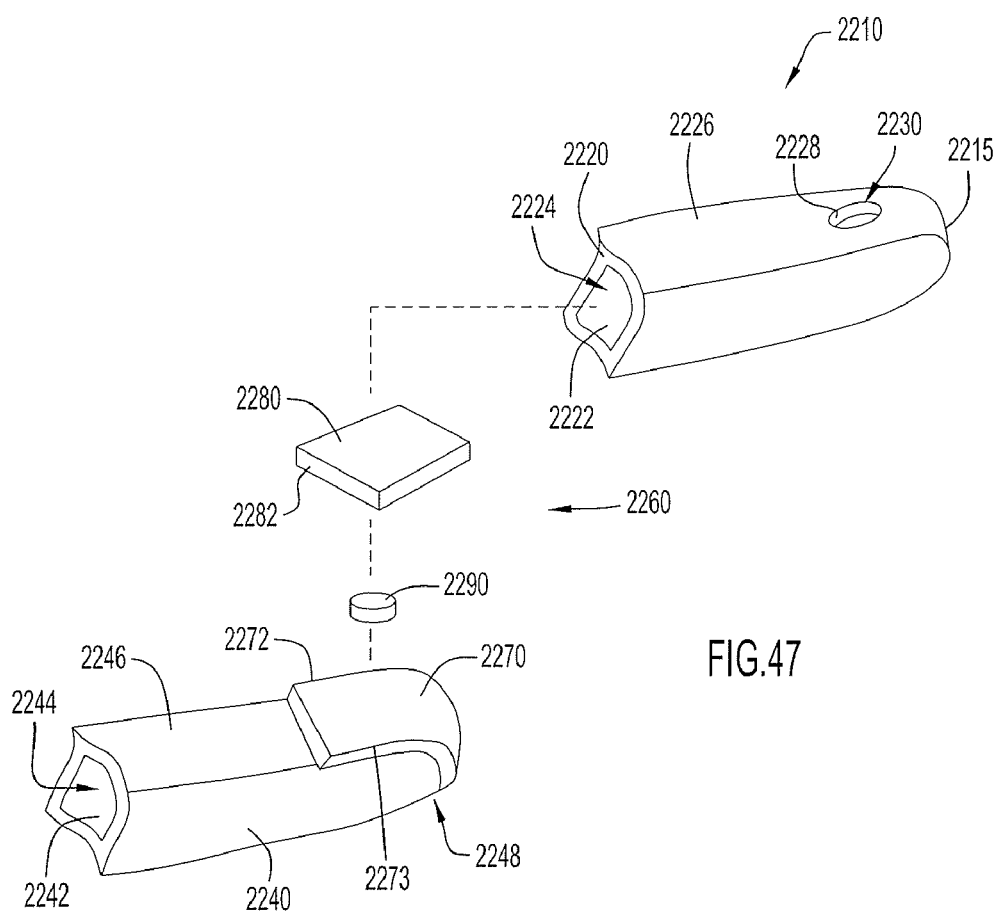
FIG. 47 is an exploded perspective view of the finger receptacle illustrated in FIG. 45.

Referring to FIG. 47, an exploded perspective view of the components of the finger receptacle 2210 is illustrated. In this embodiment, the finger receptacle 2210 includes two layers of material as opposed to the single layer of material of the finger receptacle 2110 illustrated in FIGS. 40-44. The two layers of material can provide additional warmth as compared to the single layer of material of finger receptacle 2110. As shown, the finger receptacle 2210 includes an inner layer or lining 2240 relative to the wearer's hand. The finger receptacle 2210 also includes an outer layer or shell 2220 that is an outer layer for the finger receptacle 2210.

As shown in FIG. 47, the inner layer 2240 includes an inner surface 2242 that defines a receptacle 2244 into which the user can insert a finger. The layer 2240 also includes an outer surface 2246 that extends around the outside of the layer 2240. The layer 2240 also includes a distal end or tip 2248.

In this embodiment, the finger receptacle 2210 includes a conductive portion 2260. The conductive portion 2260 includes conductive members 2270 and 2280 that are placed in contact with each other. The conductive portion 2260 also includes an insert 2290 that is disposed between the conductive members 2270 and 2280. In one embodiment, the conductive members 2270 and 2280 and the insert 2290 can be substantially the same as the conductive members 2150 and 2160 and the insert 2170 discussed above with respect to finger receptacle 2110. Each of the conductive members 2270 and 2280 can be a silver-plated rip-stop material available from Deer Creek.

Figure 48:
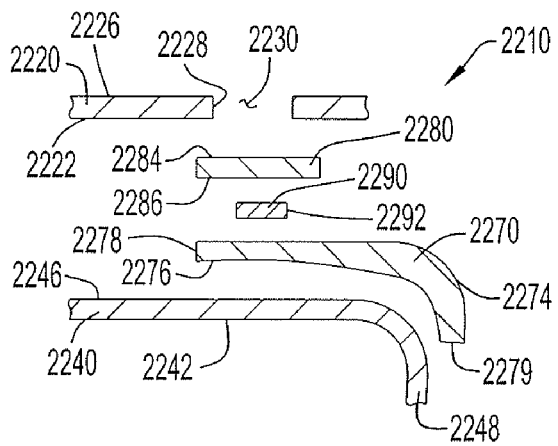
FIG. 48 is a partial cross-sectional exploded side view of some components of the finger receptacle illustrated in FIG. 45.
Figure 49:
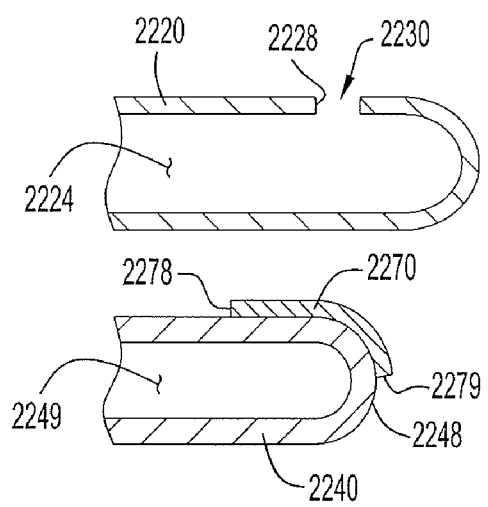
FIG. 49 is another partial cross-sectional exploded side view of some components of the finger receptacle illustrated in FIG. 45.

In this embodiment, the conductive member 2270 is coupled to the layer 2240 and in particular, to the outer surface 2246 of layer 2240. As shown in FIGS. 47-49, the conductive member 2270 includes side edges 2272 and 2273, an outer surface 2274, an opposite inner surface 2276, and ends 2278 and 2279. The conductive member 2270 is coupled to layer or lining 2240 such that the inner surface 2276 of the conductive member 2270 is in contact with the outer surface 2246 of layer 2240. The conductive member 2270 can be coupled to the layer 2240 by sewing, stitching, an adhesive, or other conventional coupling technique or mechanism. The conductive member 2270 is located such that the distal end 2279 of the conductive member 2270 extends around to a location proximate to the distal tip 2248 of the receptacle 2210 (see FIG. 49). In one embodiment, the conductive member 2270 extends approximately one-and-a-half (1.5) inches from the tip 2248 of the receptacle 2210 to the knuckle patch or area of the finger receptacle 2210.

As shown in FIGS. 47 and 49, layer 2220 includes an inner surface 2222 that defines a receptacle or interior region 2224 in which the layer 2240 can be inserted. The layer 2220 also includes an outer surface 2226 that has an opening 2230 defined by an edge 2228. In this embodiment, the opening 2230 is substantially circular. The opening 2230 may be located approximately 5 mm from the tip and may have a diameter of approximately 8 mm. However, in different embodiments, the shape and configuration of the opening 2230 can vary.

Figure 50:
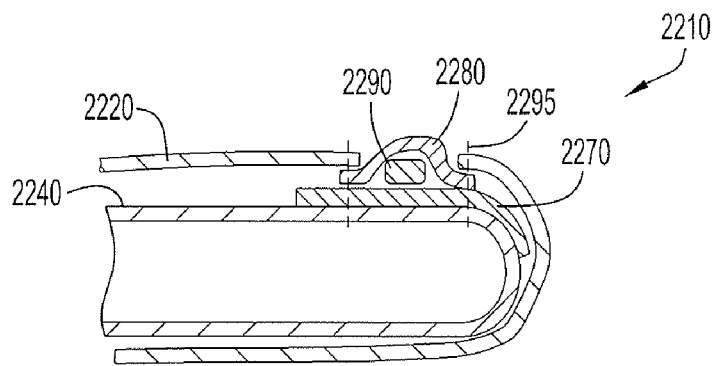
FIG. 50 is a cross-sectional side view of a portion of the finger receptacle illustrated in FIG. 45, taken along the line "50-50."

Returning to the conductive member 2260, the conductive member 2280 has an inner surface 2286, an opposite outer surface 2284, and an edge 2282 that extends around the sides of the conductive member 2280. While the conductive member 2280 is illustrated as being substantially square, in alternative embodiments, the shape or configuration of the conductive member 2280 can vary. The insert 2290 is located between the conductive members 2280 and 2270 as shown in FIGS. 48 and 50. The insert 2290 may be made of a hard EVA material and may be die-cut formed with an outer edge 2292. In one embodiment, the insert 2290 has a diameter of 5 mm and a thickness of 2 mm.

As shown in FIG. 50, stitching 2295 is used to couple the conductive portion 2260 to the finger receptacle 2210. In particular, the stitching 2295 passes through layer 2220, conductive member 2280, conductive member 2270, and layer 2240. As shown in FIGS. 46 and 50, the insert 2290 causes a portion of the conductive member 2280 to extend beyond the outer surface of layer 2220. As a result, contact between the conductive portion 2260 and an electronic device is facilitated.

Figures 51, 52:
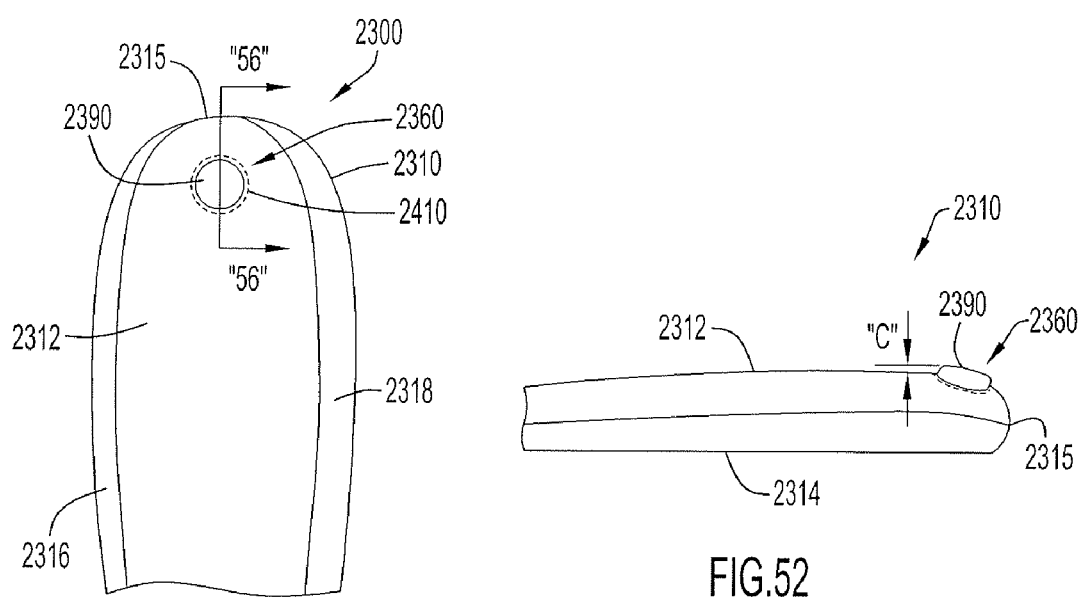
FIG. 51 is a palm side view of another embodiment of a finger receptacle for a hand covering.
FIG. 52 is a side view of the finger receptacle illustrated in FIG. 51.

The conductive member 2270 is located on the inner lining 2240 in which a wearer's finger is located. Due to the proximity of the conductive member 2270 to the wearer's finger, an energetic charge from the finger is transferred to conductive member 2270. As conductive member 2280 is in contact with conductive member 2270, the charge is transferred to conductive member 2270 which is exposed so that it can contact an electronic device as desired.

to FIGS. 51-56, an alternative embodiment of a portion of a hand covering is illustrated. In this embodiment, the hand covering includes a shell 2300 that has several finger receptacles. For ease of reference, only finger receptacle 2310 is illustrated in FIGS. 51-56. As shown in FIGS. 51 and 52, the finger receptacle 2310 includes a palm side or surface 2312, a back side or surface 2314 opposite to the palm side 2312, and two sides 2316 and 2318. The finger receptacle 2310 also includes a distal end or tip 2315.

Referring to FIGS. 51 and 52, the finger receptacle 2310 includes a conductive portion 2360. The conductive portion 2360 includes a conductive member 2390 that extends outwardly a distance "C" from the outer surface of the finger receptacle 2310.

Figure 53:
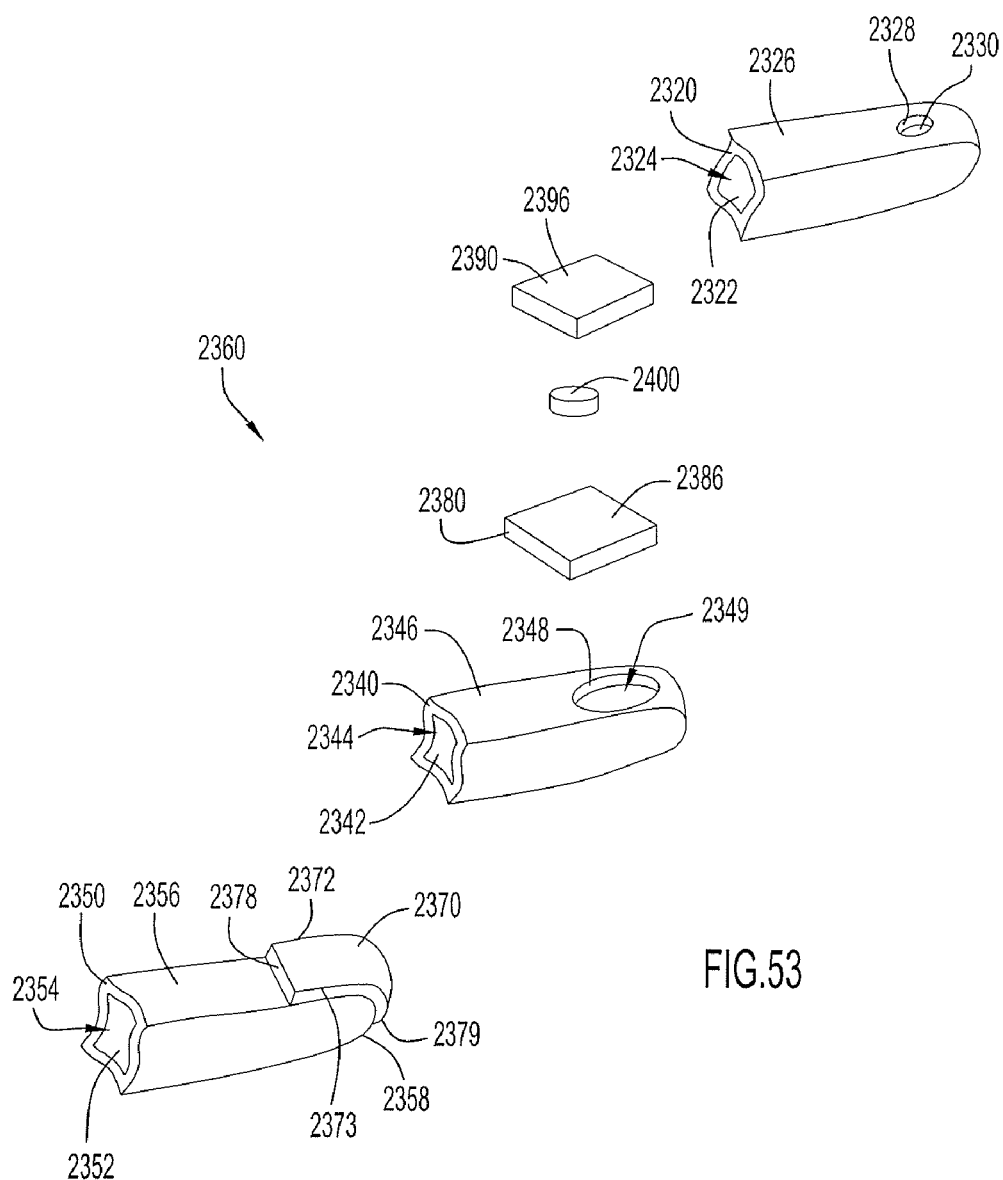
FIG. 53 is an exploded perspective view of the finger receptacle illustrated in FIG. 51.
Figure 55:
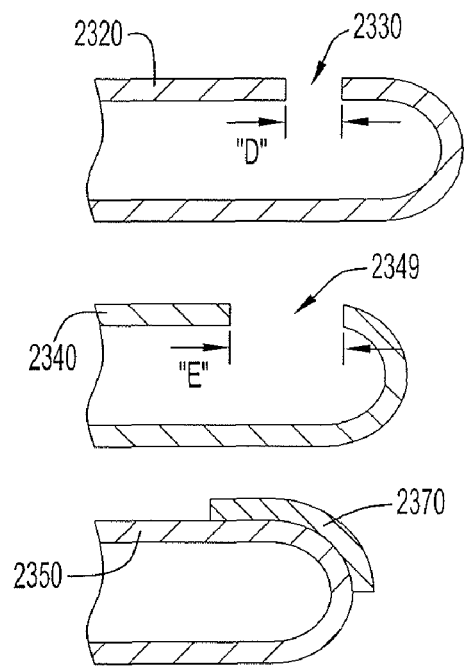
FIG. 55 is another partial cross-sectional exploded side view of some components of the finger receptacle illustrated in FIG. 51.

Referring to FIG. 53, an exploded perspective view of the components of the finger receptacle 2310 is illustrated. In this embodiment, the finger receptacle 2310 includes three layers of material as opposed to the previously described single-layer and double-layer finger receptacles 2110 and 2210, respectively. The additional layer of material in finger receptacle 2310 provides additional warmth and protection from the elements for the wearer's hand. As shown in FIGS. 53 and 55, the finger receptacle 2310 includes an inner layer 2350, a middle layer 2340, and an outer layer 2320.

As shown in FIG. 53, the inner layer 2350 includes an inner surface 2352 that defines an interior region or receptacle 2354 into which the user can insert a finger. The layer 2350 also includes an outer surface 2356 that extends around the outside of the layer 2350. The layer 2350 also includes a distal end or tip 2358.

The middle layer 2340 is a layer of insulation or insulative material that provides insulation for the user's finger. The middle layer 2340 includes an inner surface 2342 that defines an interior region or receptacle 2344 into which the inner layer 2350 is inserted. Layer 2340 also includes an outer surface 2346 that extends around the outside of the layer 2340. Layer 2340 also includes an opening 2349 that is defined by an edge 2348. The opening 2349 extends through layer 2340 from the outer surface 2346 to the inner surface 2342. As illustrated in FIGS. 53 and 55, the opening 2349 is located proximate to the area at which the fingertip of the user's finger is located. Also, opening 2349 is sufficiently sized to facilitate contact between some adjacent components or portions of the conductive portion 2360, as described below.

Referring to FIG. 53, the outer layer 2320 includes an inner surface 2322 that defines a receptacle 2324 to which middle layer 2340 is inserted. Layer 2320 also includes an outer surface 2326 with an opening 2330 that is defined by an edge 2328. The opening 2330 extends through the layer 2320 from the outer surface 2326 to the inner surface 2322. As shown in FIG. 55, the opening 2330 formed in outer layer 2320 may have a dimension "D" that is smaller than the opening 2349 formed in middle layer 2340 that has a dimension "E."

The conductive portion 2360 of finger receptacle 2310 includes conductive members 2370, 2380, and 2390. As shown in FIG. 53, conductive member 2370 is coupled to layer 2350 and in particular, to the outer surface 2356 of layer 2350. Conductive member 2370 includes side edges 2372 and 2373, an inner surface 2374, an opposite outer surface 2376, and ends 2378 and 2379. The conductive member 2370 is coupled to layer or lining 2350 such that the inner surface 2376 of the conductive member 2370 is in contact with the outer surface 2356 of layer 2350. The conductive member 2370 can be coupled to the layer 2350 by sewing, stitching, an adhesive, or other conventional coupling technique or mechanism. The conductive member 370 is located such that the distal end 2379 of the conductive member 370 extends around to a location proximate to the distal tip 2358 of the receptacle 310 (see FIG. 55). In one embodiment, the conductive member 2370 extends approximately one-and-a-half (1.5) inches from the tip 2358 of the receptacle 2310 to the knuckle patch or area of the finger receptacle 2310.

Figure 54:
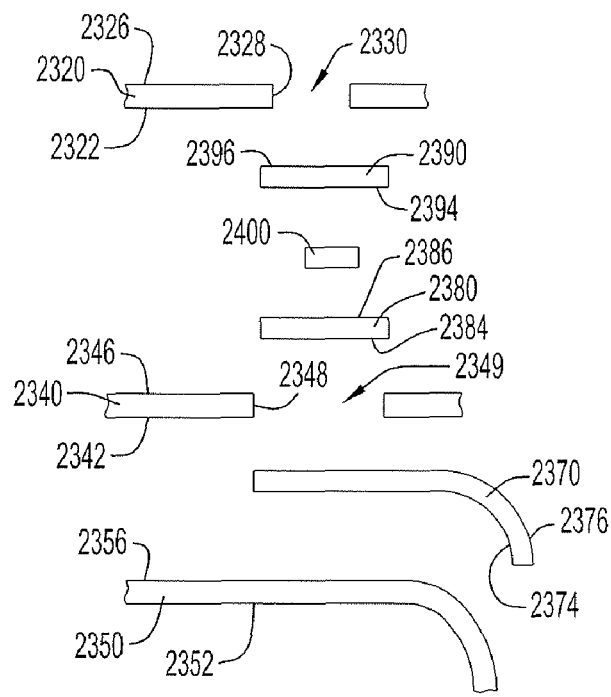
FIG. 54 is a partial cross-sectional exploded side view of some components of the finger receptacle illustrated in FIG. 51.

Conductive members 2380 and 2390 are located between middle layer 2340 and outer layer 2320. As shown in FIGS. 53 and 54, conductive member 2380 includes an inner surface 2384 and an outer surface 2386. Similarly, conductive member 2390 includes an inner surface 2394 and an outer surface 2396. Each of the conductive members 2370, 2380, and 2390 can be fabric with conductive properties, such as a fabric with conductive threads or fibers woven or inserted therein.

An exploded arrangement of the layers 2320, 2340, and 2350 and the components of the conductive portion 2360 is illustrated in FIG. 54. In this arrangement, layer 2350 is the innermost layer with inner surface 2352 being in contact with the user's finger. Conductive member 2370 is coupled to layer 2350 with the inner surface 2374 in engagement with outer surface 2356. The conductive member 2370 is located so that a portion of the conductive member 2370 is aligned with and extends over the opening 2349 in layer 2340. In one embodiment, the conductive member 2370 extends approximately one-and-a-half (1.5) inches from the tip 2358 of the receptacle 2310 to the knuckle patch or area of the finger receptacle 2310.

Conductive member 2380 is located on the outer side of conductive member 2370 and is arranged such that surface 2384 is directed inwardly and surface 2386 is directed outwardly. Next to conductive member 2380 is an insert 2400, which is made of a non-conductive material. Another conductive member 2390 is located on the outer side of insert 2400 and is oriented with surface 2394 directed inwardly and surface 2396 directed outwardly. Finally, layer 2320 is the outermost layer with opening 2330 in alignment with conductive member 2390.

Figure 56:
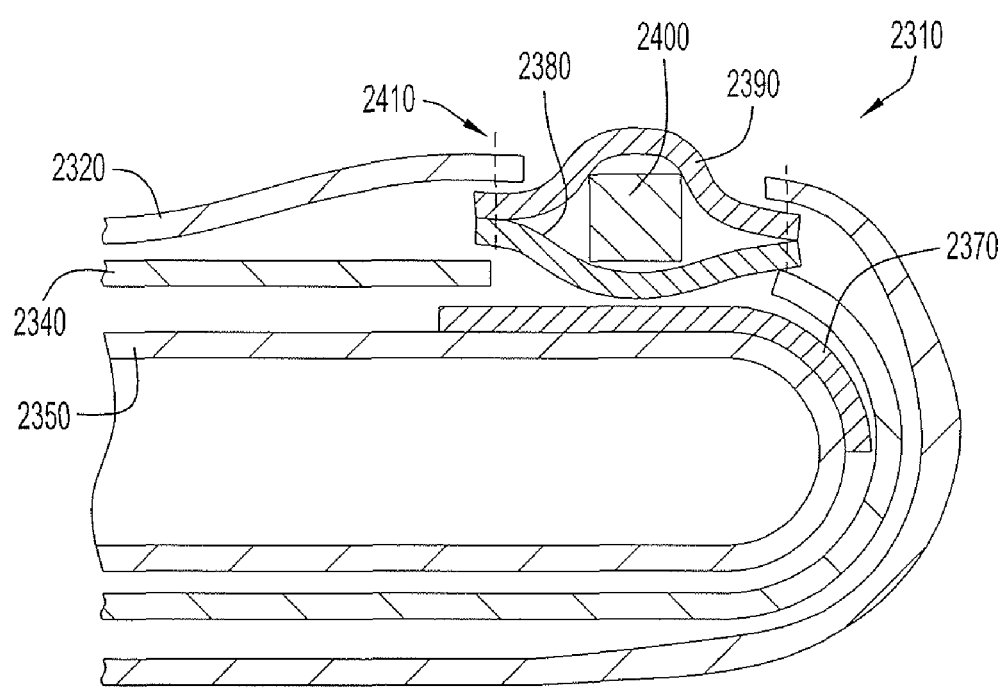
FIG. 56 is a cross-sectional side view of a portion of the finger receptacle illustrated in FIG. 51, taken along the line "56-56."

Referring to FIG. 56, an assembled arrangement of the components of finger receptacle 2310 is illustrated. As shown, stitching 2410 is used to couple the outer layer 2320 and the conductive members 2380 and 2390 together. The stitching 2410 extends around the opening 2330 in the outer layer as illustrated in FIG. 51. The insert 2400 is sized so that a portion of the conductive member 2390 extends outwardly beyond the outer surface of the outer layer 2320.

As shown in FIG. 56, conductive member 2380 is in contact with conductive member 2370. Any charge present in conductive member 2370 from the proximity of the wearer's finger is transferred to conductive member 2380 due to contact between conductive members 2370 and 2380. Similarly, conductive member 2390 is in contact with conductive member 2380. Any charge that is present in conductive member 2380 is transferred to conductive member 2390 based on the contact between conductive members 2380 and 2390. Thus, any charge generated by the wearer's finger is passed through conductive members 2370, 2380, and 2390 to an electronic device with which the shell 2300 is used.

Figures 57, 58:
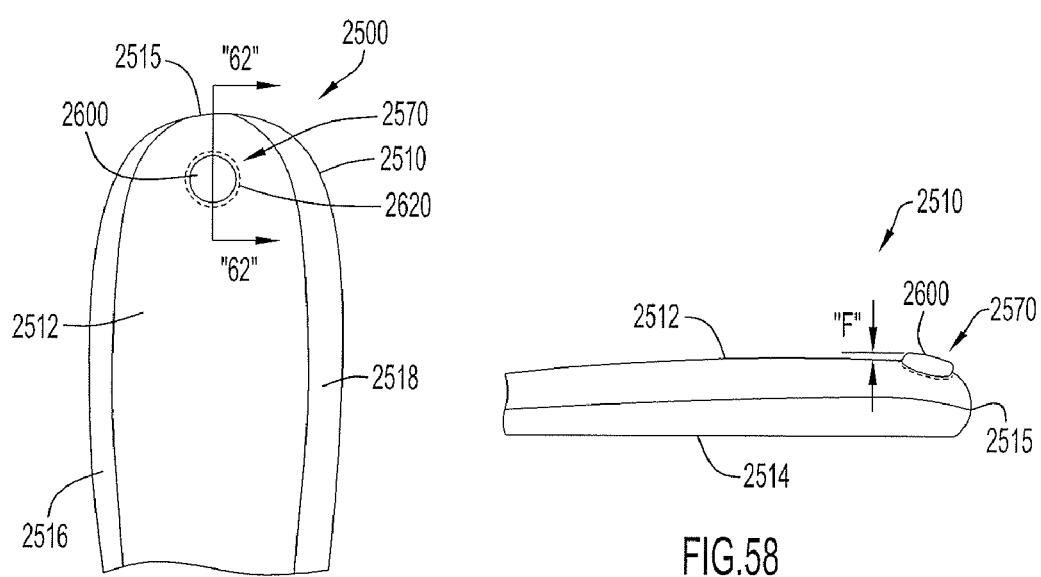
FIG. 57 is a palm side view of another embodiment of a finger receptacle for a hand covering.
FIG. 58 is a side view of the finger receptacle illustrated in FIG. 57.

Referring to FIGS. 57-62, an alternative embodiment of a portion of a hand covering is illustrated. In this embodiment, the hand covering includes a shell 2500 that has several finger receptacles. For ease of reference, only finger receptacle 2510 is illustrated in FIGS. 57-62. As shown in FIGS. 57 and 58, the finger receptacle 2510 includes a palm side or surface 2512, a back side or surface 2514 opposite to the palm side 2512, and two sides 2516 and 2518. The finger receptacle 2510 also includes a distal end or tip 2515.

Referring to FIGS. 57 and 58, the finger receptacle 2510 includes a conductive portion 2570. The conductive portion 2570 includes a conductive member 2600 that extends outwardly a distance "F" from the outer surface of the finger receptacle 2510. In alternative embodiments, the distance "F" that the conductive member 2600 extends can vary.

Figure 59:
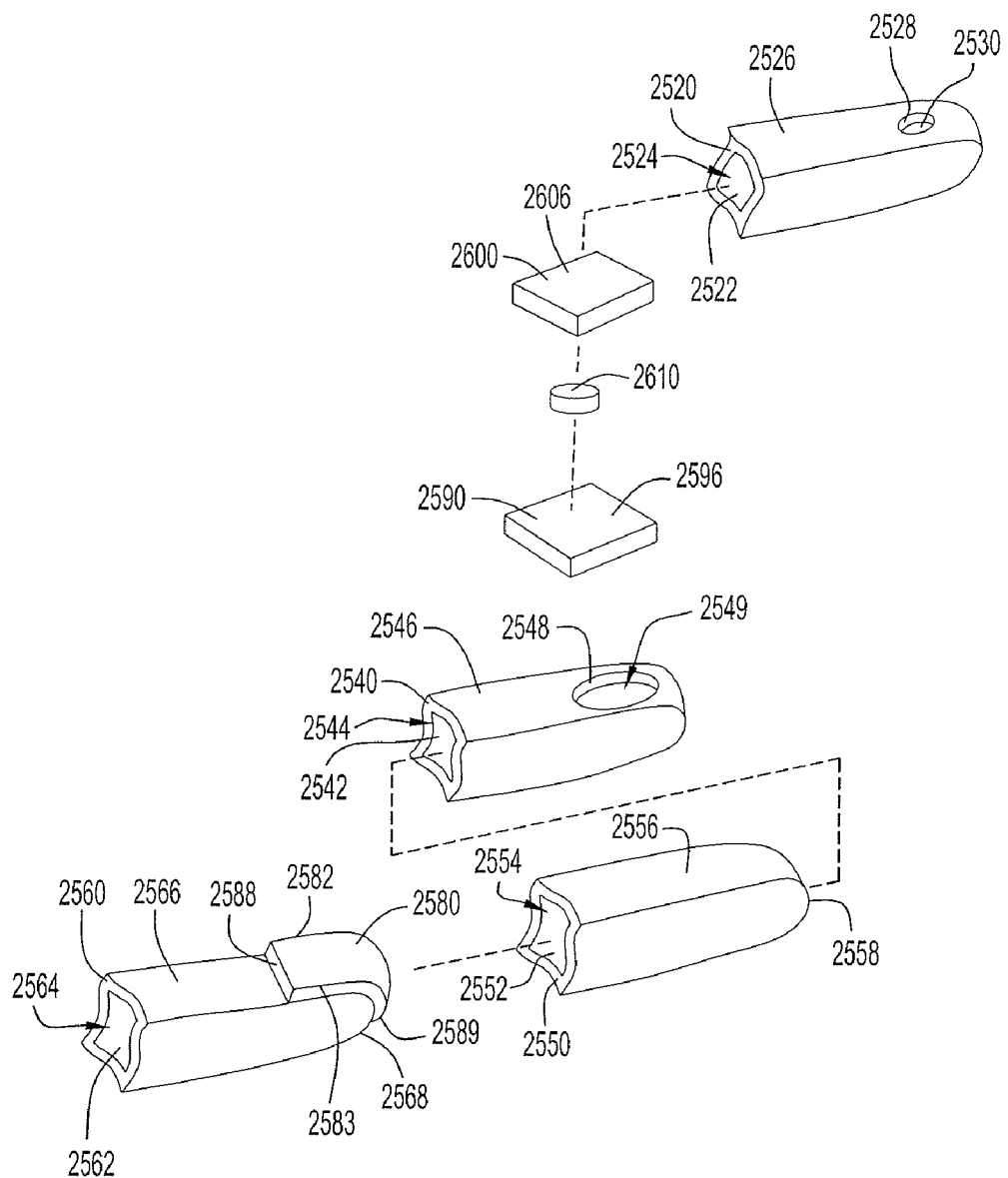
FIG. 59 is an exploded perspective view of the finger receptacle illustrated in FIG. 57.

Referring to FIG. 59, an exploded perspective view of the components of the finger receptacle 2510 is illustrated. In this embodiment, the finger receptacle 2510 includes four layers of material. As shown, the finger receptacle 2510 includes an inner layer 2560, middle layers 2550 and 2540, and an outer layer 2520. The layers are arranged such that the order of the layers from the user's finger outwardly are layer 2560, layer 2550, layer 2540, and layer 2520.

As shown in FIG. 59, the inner layer 2560 includes an inner surface 2562 that defines an interior region or receptacle 2564 into which the user can insert a finger. The layer 2560 also includes an outer surface 2566 that extends around the outside of the layer 2560. The layer 2560 also includes a distal end or tip 2568.

Layer 2550 is a waterproof membrane that keeps out moisture from getting to the user's finger. Layer 2550 includes an inner surface 2552 that defines an interior region or receptacle 2554 into which layer 2560 is inserted. Layer 2550 also includes an outer surface 2556 that extends around the outside of the layer 2550 and a distal end or tip 2558.

Layer 2540 is a layer of insulation or insulative material that performs the function of providing insulation for the user's finger. Layer 2540 includes an inner surface 2542 that defines a receptacle 2544 into which the layer 2550 is inserted. Layer 2540 also includes an outer surface 2546 that extends around the outside of the layer 2540. Layer 2540 also includes an opening 2549 that is defined by an edge 2548. The opening 2549 extends through layer 2540 from the outer surface 2546 to the inner surface 2542. As illustrated in FIG. 59, the opening 2549 is located proximate to the area at which the fingertip of the user's finger is located. Also, opening 2549 is sufficiently sized to facilitate contact between some adjacent components or portions of the conductive portion 2570, as described below.

Referring to FIG. 59, the outer layer 2520 includes an insert surface 2522 that defines an interior region or receptacle 2524 into which layer 2540 is inserted. Layer 2520 also includes an outer surface 2526 with an opening 2530 that is defined by an edge 2528. The opening 2530 extends through the layer 2520 from the outer surface 2526 to the inner surface 2522. To accommodate the insertion of layers 2540, 2550, and 2560, the interior region or receptacle 2524 of layer 2520 is larger than the outer diameter of any of the layers 2540, 2550, and 2560.

Figure 60:
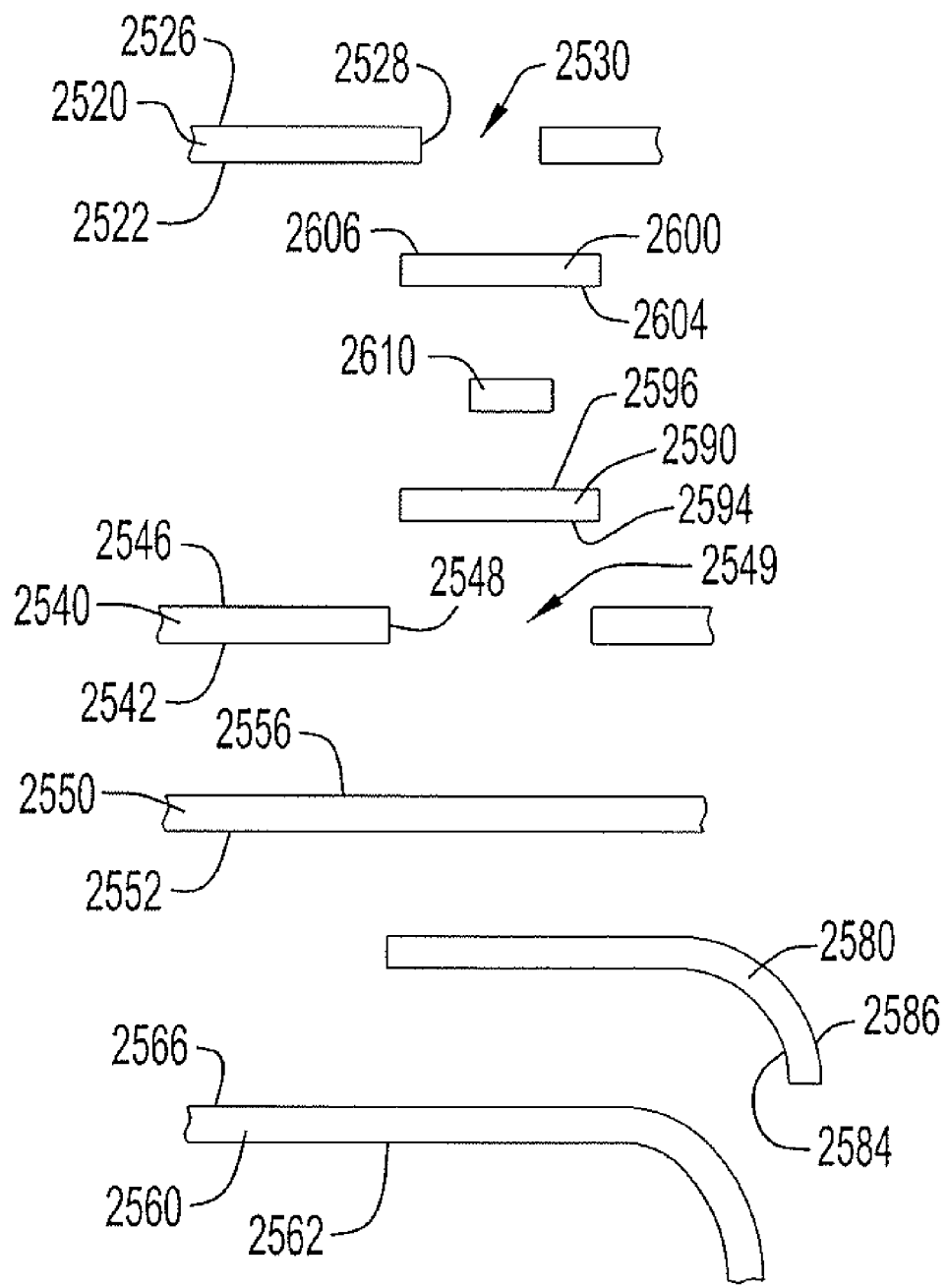
FIG. 60 is a partial cross-sectional exploded side view of some components of the finger receptacle illustrated in FIG. 57.

In this embodiment, the conductive portion 2570 includes several conductive members. In particular, the conductive portion 2570 includes a conductive member 2580 that is coupled to layer 2560, and conductive members 2590 and 2600 that are located between middle layer 2540 and outer layer 2520. As shown in FIGS. 59 and 60, conductive member 2590 includes an inner surface 2594 and an outer surface 2596. Similarly, conductive member 2600 includes an inner surface 2604 and an outer surface 2606. Each of the conductive members 2580, 2590, and 2600 can be fabric with conductive properties, such as a fabric with conductive threads or fibers woven or inserted therein.

An arrangement of the layers 2520, 2540, 2550, and 2560 and the components of the conductive portion 2570 is illustrated in FIG. 59. In this arrangement, layer 2560 is the innermost layer with inner surface 2562 being in contact with the user's finger. Conductive member 2580 is coupled to layer 2560 with the inner surface 2584, which is opposite to outer surface 2586, in engagement with outer surface 2566. Layer 2550 is oriented so that it is in contact with conductive member 2580. As shown in FIG. 60, inner surface 2552 is located so that it contacts the inner layer 2560 and conductive member 2580. The outer surface 2556 is oriented toward the inner surface 2542 of layer 2540.

Conductive member 2590 is located on the outer side of layer 2540 and is arranged such that surface 2594 is directed inwardly and surface 2596 is directed outwardly. The conductive member 2590 is aligned with the opening 2549 located in layer 2540. Next to conductive member 2590 is an insert 2610, which is made of a non-conductive material. Another conductive member 2600 is located on the outer side of insert 2610 and is oriented with surface 2604 directed inwardly and surface 2606 directed outwardly. Finally, layer 2520 is the outermost layer with an opening 2530 that is aligned with conductive member 2600. The inner surface 2522 of outer layer 2520 is contacted by conductive member 2600.

Figure 61:
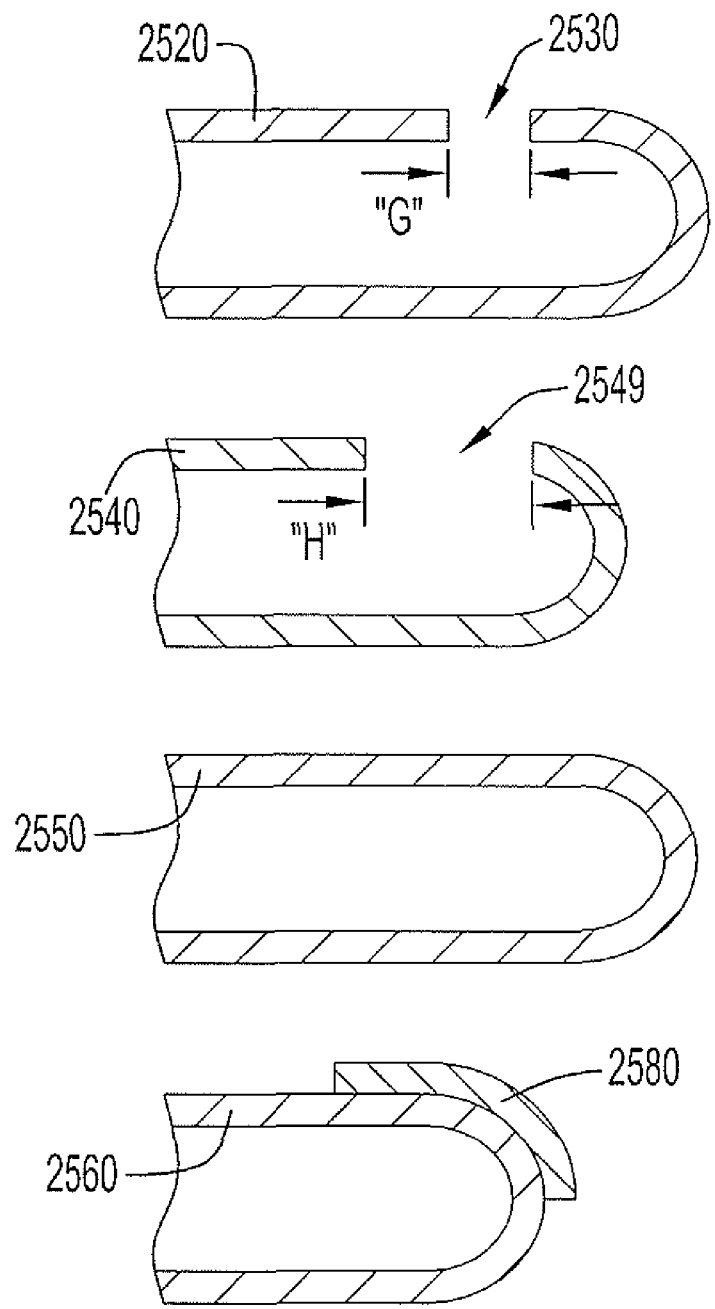
FIG. 61 is another partial cross-sectional exploded side view of some components of the finger receptacle illustrated in FIG. 57.

Referring to FIG. 61, the opening 2530 in outer layer 2520 has a diameter with a "G" dimension. The opening 2549 in middle layer 2540 has a diameter with an "H" dimension. In one embodiment, the dimension "H" is larger than dimension "G." Notably, middle layer 2550 does not include any opening proximate to openings 2530 and 2549 as layer 2550 is a waterproof membrane.

Figure 62:
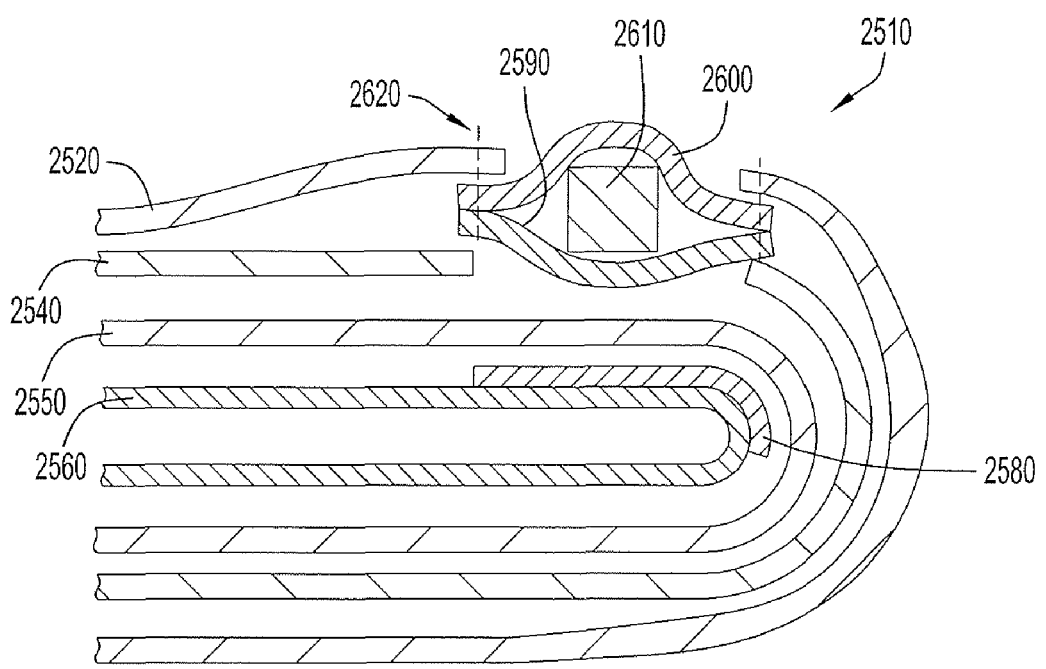
FIG. 62 is a cross-sectional side view of a portion of the finger receptacle illustrated in FIG. 10, taken along the line "62-62."

Referring to FIG. 62, the assembled arrangement of the components of finger receptacle 2510 is illustrated. As shown, stitching 2620 is used to couple the outer layer 2520 and the conductive members 2590 and 2600 together. In the illustrated embodiment, the stitching 2620 extends around the opening 2530 in the outer layer 2520 as illustrated in FIG. 57. The insert 2610 is sized so that a portion of the conductive member 2600 extends outwardly beyond the outer surface of the layer 2520. In an alternative embodiment, the stitching 2620 may pass through layer 2540. Moreover, in an alternative embodiment, the stitching 2620 may also be coupled to layer 2550.

As shown in FIG. 62, conductive member 2590 is in contact with conductive member 2600. Any charge present in conductive member 2590 is transferred to conductive member 2600 due to contact between the members 2590 and 2600. While conductive member 2580 is not in contact with conductive member 2590, the members 2580 and 2590 are close enough to each other that any charge that is present in conductive member 2580 is transferred to conductive member 2590. Thus, any charge generated by the user's finger is passed through conductive members 2580, 2590, and 2600 to an electronic device with which the shell 2500 is used.

In an alternative embodiment of a hand covering, an additional liner or layer of material may be included with the hand covering illustrated in FIGS. 57-62. In the embodiment illustrated in FIG. 63, the shell 2700 includes the same layers of material as described above for shell 2500. In particular, the inner layer 2710 corresponds to inner layer 2560 illustrated in FIG. 59. Layer 2710 includes an inner surface 2712 defining an interior region 2714, and an outer surface 2716, and a distal tip or end 2718. Layer 2710 also includes a conductive member 2720 with edges 2722 and 2723 and ends 2728 and 2719. The conductive member 2720 is coupled to the layer 2710.

In this embodiment, layer 2740 is an additional layer of material or a lining that can be inserted into layer 2710. For example, layer 2740 can be a next-to-skin liner glove that can be worn by itself. Layer or liner 2740 includes an inner surface 2742 that defines an interior region or receptacle 2744 into which a user can insert a finger. The layer 2740 also includes an outer surface 2746 and a distal end or tip 2748. The receptacle 2714 of layer 2710 is configured to accommodate the liner 2740 therein.

Referring to FIG. 64, an alternative embodiment of a finger receptacle is illustrated. In this embodiment, the layer or liner 2740 is the same as layer 2740 illustrated in FIG. 63 with the addition of a conductive portion 2750 that is coupled to the outer surface 2746 of the lining 2740. The conductive portion 2750 can be the same as conductive portion 2720 as illustrated in FIG. 63.

In different embodiments, the part of the conductive portion that extends from a finger receptacle can be used as a tactility component. A tactility component is configured to facilitate the application of a concentrated force from a finger contained in the finger receptacle or thumb receptacle to an object.

In various embodiments, the size, shape and configuration of each conductive material portion may vary depending on the size and type of interface on the electronic device with which the user will interact. Also, the locations of conductive material on hand coverings can vary and can be in addition to the forefinger and thumb areas on the hand coverings. In an alternative embodiment, a conductive sheath can be coupled to a finger receptacle on a hand covering.

While the invention has been described in detail and with references to specific embodiments thereof, it will be apparent to one skilled in the art that various changes and modifications can be made therein without departing from the spirit and scope thereof. Thus, it is intended that the present invention covers the modifications and variations of this invention.

What is claimed is:

1. An apparatus, comprising:
   a shell configured to cover at least a portion of a hand;
   a first conductive membrane coupled to the shell, a first portion of the first conductive membrane projecting through an opening of the shell and configured to interact with an interface of an electronic device, a second portion of the first conductive membrane disposed between the shell and the hand when the shell covers the hand; and
   a second conductive membrane, the second conductive membrane electrically coupled to the first conductive membrane and disposed between the shell and the hand when the shell covers the hand.

2. The apparatus of claim 1, further comprising:
   an insert disposed between at least a portion of the first conductive membrane and at least a portion of the second conductive membrane.

3. The apparatus of claim 2, wherein the first conductive membrane is coupled to the shell.

4. The apparatus of claim 1, wherein the shell defines an interior volume, the apparatus further comprising:
   a liner disposed within the interior volume, the second conductive membrane being coupled to the liner.

5. The apparatus of claim 1, wherein the shell defines an interior volume, the apparatus further comprising:
   an insulating layer disposed within the interior volume;
   a liner disposed within the interior volume, the insulating layer of material being disposed between at least a portion of the shell and the liner; and
   a third conductive membrane, the third conductive membrane coupled to the liner, the second conductive membrane electrically coupled to the third conductive membrane.

6. The apparatus of claim 5, wherein a first portion of the second conductive membrane projects through an opening of the insulating layer, electrically coupling the second conductive membrane with the third conductive membrane, a second portion of the second conductive membrane disposed between the insulating layer and the shell.

7. The apparatus of claim 6, wherein the first conductive membrane and the second conductive membrane are fixedly coupled and the second conductive membrane and the third conductive membrane are moveably coupled.

8. The apparatus of claim 5, further comprising:
   a non-conductive insert disposed between at least a portion of the first conductive membrane and at least a portion of the second conductive membrane.

9. The apparatus of claim 6, wherein the opening of the shell is substantially aligned with the opening of the insulating layer.

10. The apparatus of claim 9, wherein the opening of the shell has a size different than a size of the opening of the insulating layer.

11. The apparatus of claim 5, wherein the insulating layer is a first insulating layer, the apparatus further comprising:
a second insulating layer disposed between the first insulating layer and the liner.

12. An apparatus, comprising:
a shell configured to cover a hand and defining a finger receptacle;
a liner disposed within the finger receptacle;
a first conductive membrane coupled to the shell, a first portion of the first conductive membrane projecting through an opening of the shell, a second portion of the first conductive membrane disposed between the shell and the liner; and
a second conductive membrane in electrical contact with the first conductive membrane, the second conductive membrane coupled to the liner.

13. The apparatus of claim 12, wherein at least one of the first conductive membrane or the second conductive membrane is flexible.

14. The apparatus of claim 12, further comprising:
a third conductive membrane in contact with the second conductive membrane.

15. The apparatus of claim 12, further comprising:
an insulating layer disposed between the shell and the liner; and
a third conductive membrane coupled to the insulating layer.

16. A apparatus comprising:
a shell configured to cover a hand including a finger receptacle, the shell defining an opening;
a liner disposed within the shell;
a flexible conductive membrane coupled to the finger receptacle, a first portion of the flexible conductive membrane configured to be electrically coupled, via the opening, to an interface of an electronic device disposed outside the shell, a second portion of the flexible conductive membrane disposed between the shell and the hand when the shell covers the hand; and
an insert disposed between the flexible conductive membrane and the liner.

17. The apparatus of claim 16, wherein the flexible conductive material is stitched to the shell and to the liner.

18. The apparatus of claim 16, wherein at least a portion of the liner is conductive.

19. The apparatus of claim 16, wherein a thickness of the shell of the finger receptacle is less than a thickness of the shell of the rest of the apparatus.

20. The apparatus of claim 16, wherein the shell is waterproof.

* * * * *